(12) United States Patent
Jang et al.

(10) Patent No.: US 11,184,526 B2
(45) Date of Patent: Nov. 23, 2021

(54) ELECTRONIC APPARATUS AND CONTROL METHOD THEREOF

(71) Applicant: Samsung Electronics Co., Ltd., Suwon-si (KR)

(72) Inventors: Sunghyun Jang, Suwon-si (KR); Donguk Kang, Suwon-si (KR); Jaephil Koo, Suwon-si (KR); Seun Ryu, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/583,951

(22) Filed: Sep. 26, 2019

(65) Prior Publication Data
US 2020/0221019 A1 Jul. 9, 2020

(30) Foreign Application Priority Data

Jan. 8, 2019 (KR) .................. 10-2019-0002340

(51) Int. Cl.
| | |
|---|---|
| *G06F 3/0481* | (2013.01) |
| *G06F 3/01* | (2006.01) |
| *H04N 5/232* | (2006.01) |
| *G06F 1/16* | (2006.01) |
| *G06F 3/0484* | (2013.01) |

(52) U.S. Cl.
CPC ......... *H04N 5/23216* (2013.01); *G06F 3/013* (2013.01); *G06F 3/04815* (2013.01); *H04N 5/23296* (2013.01); *G06F 1/1643* (2013.01); *G06F 1/1686* (2013.01); *G06F 3/017* (2013.01); *G06F 3/04842* (2013.01); *G06F 3/04845* (2013.01)

(58) Field of Classification Search
CPC ...... G06F 1/1643; G06F 1/1686; G06F 3/013; G06F 3/017; G06F 3/04815; G06F 3/04842; G06F 3/04845; H04N 5/23216; H04N 5/23296
USPC .................... 345/87–104, 156–169
See application file for complete search history.

(56) References Cited

U.S. PATENT DOCUMENTS

| | | |
|---|---|---|
| 8,264,545 B2 | 9/2012 | Suzuki |
| 9,541,998 B2 | 1/2017 | Klug et al. |
| 9,596,413 B2 | 3/2017 | Suh et al. |
| 9,723,205 B2 | 8/2017 | Juhola et al. |
| 10,055,081 B2 | 8/2018 | Ohashi |

(Continued)

FOREIGN PATENT DOCUMENTS

JP 6302061 3/2018

*Primary Examiner* — Kwin Xie
(74) *Attorney, Agent, or Firm* — Staas & Halsey, LLP

(57) ABSTRACT

An electronic apparatus includes a display panel comprising a plurality of image display pixels and a plurality of image sensing elements, each image sensing element being disposed between the plurality of image display pixels, an optical element disposed on an upper portion of the display panel, the plurality of image sensing elements being configured to sense an incident light through the optical element, and a processor configured to control the panel device to display an image generated based on the sensed incident light, receive a user input corresponding to a partial area of the displayed image, control the optical element to magnify the partial area of the displayed image, and control the panel device to display a magnified image of the partial area.

18 Claims, 28 Drawing Sheets

(56) References Cited

U.S. PATENT DOCUMENTS

| | | | |
|---|---|---|---|
| 2014/0035902 A1* | 2/2014 | An | H04N 13/128 |
| | | | 345/419 |
| 2014/0091991 A1* | 4/2014 | An | H04N 13/31 |
| | | | 345/32 |
| 2015/0009334 A1* | 1/2015 | Kwon | G06F 3/013 |
| | | | 348/164 |
| 2015/0312445 A1* | 10/2015 | Cha | H04N 5/232933 |
| | | | 348/48 |
| 2016/0026253 A1* | 1/2016 | Bradski | H04N 13/344 |
| | | | 345/8 |
| 2016/0381289 A1* | 12/2016 | Kim | H04N 5/23222 |
| | | | 348/38 |
| 2017/0315372 A1* | 11/2017 | Bang | G09G 3/3208 |
| 2018/0069983 A1 | 3/2018 | Cho et al. | |

\* cited by examiner

ELECTRONIC APPARATUS AND CONTROL METHOD THEREOF

CROSS-REFERENCE TO RELATED APPLICATIONS

This application claims priority from Korean Patent Application No. 10-2019-0002340, filed on Jan. 8, 2019 in the Korean Intellectual Property Office, the disclosure of which is incorporated herein by reference in its entirety.

BACKGROUND

1. Field

The present disclosure relates generally to an electronic apparatus, and a control method thereof, and for example, to an electronic apparatus which includes an image sensing element and a control method thereof.

2. Description of the Related Art

Supported by the development of electronic technology, various types of electronic devices have been developed and provided. Display devices used in various places such as a home, an office, and a public place have been continuously developed over the past several years.

Recently, a display device in which a user can perform various interactions while viewing his or her image on a screen has been provided.

For example, a self-photographed image can be displayed on a screen through a smartphone. Most of cameras are located on the upper part of the smartphone, so a user's gaze toward the smartphone is facing the front of the smartphone. However, there is a problem in that the user's gaze on the screen does not look at the user, which is an eye gaze misalignment. In addition, since space is required for locating a camera on the upper part of the smartphone, implementing of a full screen display (bezel-less) is restricted.

SUMMARY

Various embodiments of the disclosure provide an electronic apparatus that provides a photographed image appropriate for a user interaction, thereby solving an eye gaze misalignment problem by having a plurality of image sensing elements on a display panel, and a control method thereof.

An aspect of the embodiments relates to an electronic apparatus including a display panel including a plurality of image display pixels and a plurality of image sensing elements arranged by units of at least one image display pixel, an optical element disposed on an upper portion of the display panel and projecting incident light onto the plurality of image sensing elements, and a processor configured to control the display panel to display an image obtained on the basis of an input signal received from the plurality of image sensing elements, and on the basis of a user interaction regarding a partial area of the displayed image being input, control the display panel to display an image corresponding to a user interaction on the basis of the input signal received from at least one image sensing element corresponding to the partial area.

The plurality of image display pixels may be arranged in a two-dimensional (2D) array, the plurality of image sensing elements may be arranged in a 2D form by a unit of the at least one image display pixel, and each of the plurality of image sensing elements may be disposed on the same layer as the at least one image display pixel or disposed on a different layer.

The processor may be configured to control the display panel to display an image of the partial area magnified on the basis of the input signal received from at least one first image sensing element corresponding to the partial area when the user interaction is command to partially magnify the partial area.

The processor may be configured to control the display panel to display a magnified image of the changed partial area on the basis of the input signal received from at least one second image sensing element corresponding to the changed partial area when the partial area corresponding to the partial magnification command being changed according to the user interaction.

The electronic apparatus may further include a field of view adjuster configured to adjust a field of view (FOV) of the plurality of image sensing elements.

The processor is configured to adjust the FOV of at least one image sensing element corresponding to the partial area on the basis of the user interaction, and control the display panel to display an image corresponding to the user interaction on the basis of the input signal received from the image sensing element that the FOV is adjusted.

The field of view adjuster may be disposed on an upper portion or a lower portion of the optical element, and include a liquid crystal shutter composed of a plurality of cells having a finer size than the image sensing elements.

The processor is configured to control an opening and a closing operations of each of the plurality of cells by controlling whether or not a voltage is applied to each of the plurality of cells forming the liquid crystal shutter, identify at least one image sensing element corresponding to the partial area on the basis of an arrangement position of the plurality of image sensing elements, and adjust at least one of an aperture position or aperture size of at least one liquid crystal shutter corresponding to the identified image sensing element.

The optical element may include a plurality of liquid crystal lenses whose liquid crystal alignment angles change according to an intensity of a voltage, the field of view adjustor may include a voltage applying unit that applies a voltage to the optical element, and the processor may be configured to identify at least one image sensing element corresponding to the partial area on the basis of the arrangement position of the plurality of image sensing elements, and control the voltage applying unit to apply a different voltage to at least one liquid crystal lens corresponding to the identified image sensing element.

The user interaction may include at least one of a touch interaction, a gesture interaction, or a voice interaction.

The processor may be configured to process the plurality of images on the basis of the FOV of each of the plurality of images obtained from the plurality of image sensing elements to obtain an output image to be displayed on the image display pixels.

The electronic device may further include an optical element configured to disperse light emitted from the image display pixels.

The processor may be configured to perform time-division driving so that the plurality of image sensing elements are not driven during a first period in which the plurality of image display pixels are driven, and the plurality of image display pixels are not driven during a second period in which the plurality of image sensing elements are driven.

As an aspect of the embodiments relates to a control method for an electronic apparatus including a display panel including a plurality of image display pixels and a plurality of image sensing elements arranged by units of at least one image display pixel, and an optical element disposed on the display panel and projecting incident light onto the plurality of image sensing elements, the method including displaying an obtained image on the basis of an input signal received from the plurality of image sensing elements, and on the basis of a user interaction for a partial area of the displayed image being input, displaying an image corresponding to a user interaction on the basis of the input signal received from at least one image sensing element corresponding to a partial area.

The plurality of image display pixels may be arranged in a two-dimensional array.

The plurality of image sensing elements are arranged in a two-dimensional array by a unit of the at least one image display pixel Each of the plurality of image sensing elements is disposed on the same layer as the at least one image display pixel or disposed on a different layer.

The displaying an image corresponding to the user interaction may display an image of the partial area magnified on the basis of the input signal received from at least one first image sensing element corresponding to the partial area when the user interaction is the partial magnification command for the partial area.

The displaying an image corresponding to the user interaction, when the partial area corresponding to the partial magnification command is changed according to the user interaction, may display a magnified image of the changed partial area on the basis of the input signal received from at least one second image sensing element corresponding to the changed partial area.

The electronic apparatus may further include a field of view adjuster configured to adjust a field of view (FOV) of the plurality of image sensing elements.

The displaying an image corresponding to the user interaction includes adjusting the FOV of at least one image sensing element corresponding to the partial area based on the user interaction, and displaying an image corresponding to the user interaction based on the input signal received from the image sensing element that the FOV is adjusted.

The field of view adjuster may be disposed on an upper portion or a lower portion of the optical element, and include a liquid crystal shutter formed of a plurality of cells having a finer size than the image sensing elements.

The displaying an image corresponding to the user interaction includes controlling an opening and a closing operations of each of the plurality of cells by controlling whether a voltage is applied to each of the plurality of cells forming the liquid crystal shutter, identifying at least one image sensing element corresponding to the partial area based on an arrangement position of the plurality of image sensing elements, and adjusting at least one of an aperture position or aperture size of at least one liquid crystal shutter corresponding to the identified image sensing element.

The optical element may include a plurality of liquid crystal lenses whose liquid crystal alignment angles change according to an intensity of a voltage.

The field of view adjuster includes a voltage applying unit for applying a voltage to the optical element.

The displaying an image corresponding to the user interaction includes identifying at least one image sensing element corresponding to the partial area based on the arrangement position of the plurality of image sensing elements, and controlling the voltage applying unit to apply a different voltage to at least one liquid crystal lens corresponding to the identified image sensing element.

The user interaction may include at least one of a touch interaction, a gesture interaction, or a voice interaction.

The method may further include performing time-division driving so that the plurality of image sensing elements are not driven during a first period in which the plurality of image display pixels are driven, and the plurality of image display pixels are not driven during a second period in which the plurality of image sensing elements are driven.

According to the various embodiments described above, the eye gaze misalignment problem when taking a self-photograph may be solved, thereby providing an effect of minimizing the bezel of the display apparatus.

BRIEF DESCRIPTION OF THE DRAWINGS

Understanding that these drawings depict only exemplary embodiments of the disclosure and are not therefore to be considered to be limiting of the scope of the disclosure, the principles herein are described and explained with additional specificity and detail through the use of the accompanying drawings, in which.

DETAILED DESCRIPTION

Figure 1A:
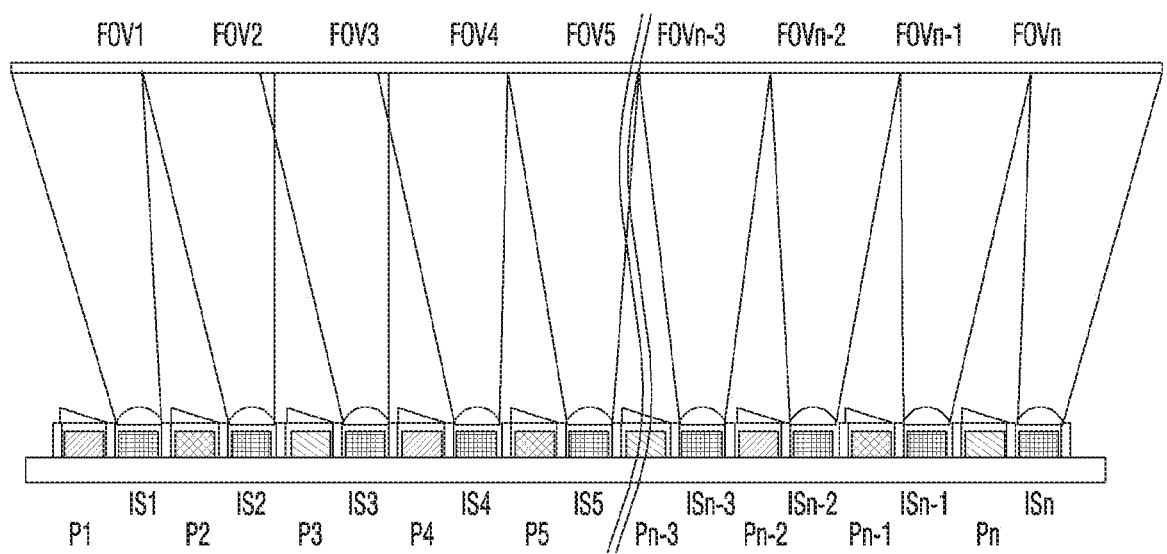
FIG. 1A is a diagram illustrating a display implementation according to an embodiment.

Hereinafter, the present disclosure will be described in detail with reference to the accompanying drawings.

The terms used in the disclosure will be briefly explained, and embodiments will be described in greater detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

The embodiments may vary, and may be provided in different embodiments. Various embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific embodiments, and not to limit the scope of the present disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The term "at least one of A or/and B" means (1) including at least one A, (2) including at least one B, or (3) including both at least one A and at least one B.

In the present disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the application with unnecessary detail.

Figure 1B:
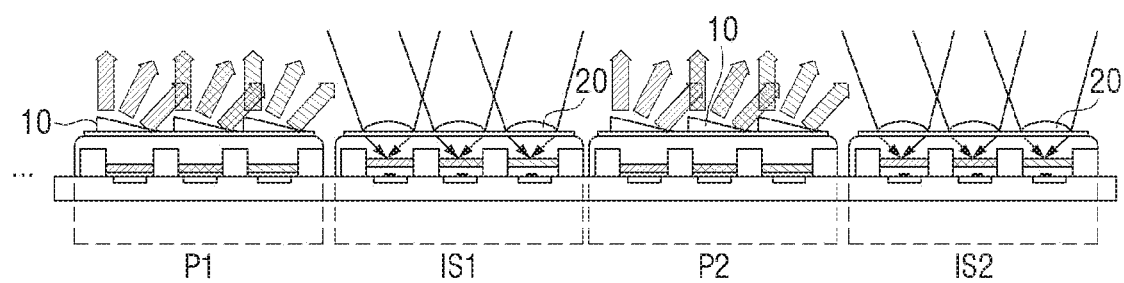
FIG. 1B is a diagram illustrating a display operation according to an embodiment.

FIGS. 1A and 1B are diagrams illustrating an implementation of an electronic apparatus according to an embodiment.

Referring to FIG. 1A, an electronic apparatus according to an embodiment may include a display including a plurality of image display pixels (P) and a plurality of image sensing elements (IS). The image display pixel may include all self-luminous elements such as organic light emitting diodes (OLED), light-emitting diode (LED), micro LED, or the like, and all types of transmissive elements such as liquid crystal display (LCD), or the like. The image sensing element may include any element that uses a photoelectric effect such as a photodiode, a CMOS, a CCD, or the like. The image sensing element may be implemented as a single sensing element (or a single pixel element) or a two-dimensional sensing element in the form of a macro pixel.

According to an embodiment, each of the plurality of image sensing elements may be arranged by a unit of at least one image display pixel. The "at least" may mean one or more than two. For example, the image display pixel and the image sensing element may be alternately arranged at a ratio of 1:1 or n:1 (n>1). In addition, the plurality of image display pixels may be arranged in a two-dimensional array, and the plurality of image sensing elements may be arranged in a two dimensional array by a unit of at least one image display pixel. In this case, each of the plurality of image sensing elements may be arranged on the same layer (e.g., on the same sheet) as at least one image display pixel, or may be arranged on a different layer (e.g., on a different sheet). For example, all of the plurality of image display pixels may be arranged on the same layer, and all of the plurality of image sensing elements may be arranged on the same layer as the plurality of image display pixels or on a different layer from the plurality of image display pixels. For another example, all of the plurality of image display pixels may be arranged on the same layer, at least some of the plurality of image sensing elements may be arranged on the same layer as the plurality of image display pixels, and the rest of the plurality of image sensing elements may be arranged on a different layer from the plurality of image display pixels.

As illustrated in FIG. 1A and FIG. 1B, the image display pixel (P) according to an embodiment may be configured to emit light, and the image sensing element (IS) is configured to concentrate light. In this case, an optical element 10 that disperses light may be arranged on the image display pixel (P), and an optical element 20 that concentrates light incident from a specific field of view may be arranged on the image sensing element (IS). For example, the optical element 10 for dispersing light may include a prism or various types of diffusing optical systems, and may be implemented in the form of one or more optical films or optical sheets. The optical element 20 for concentrating light may include a micro-lens array, a lenticular lens, or other types of fine lens arrays. The optical element 20 for concentrating light may be composed of at least one optical sheet capable of adjusting a focal distance. In addition, the optical element 20 for collecting light may include a liquid crystal panel capable of transmissive, shielding, or refracting light through electrical signal control.

Figure 2A:
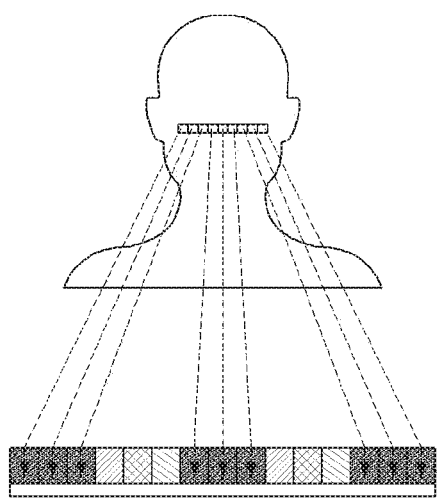
FIG. 2A is a diagram illustrating a photographing mode of an electronic apparatus according to an embodiment.
Figure 2B:
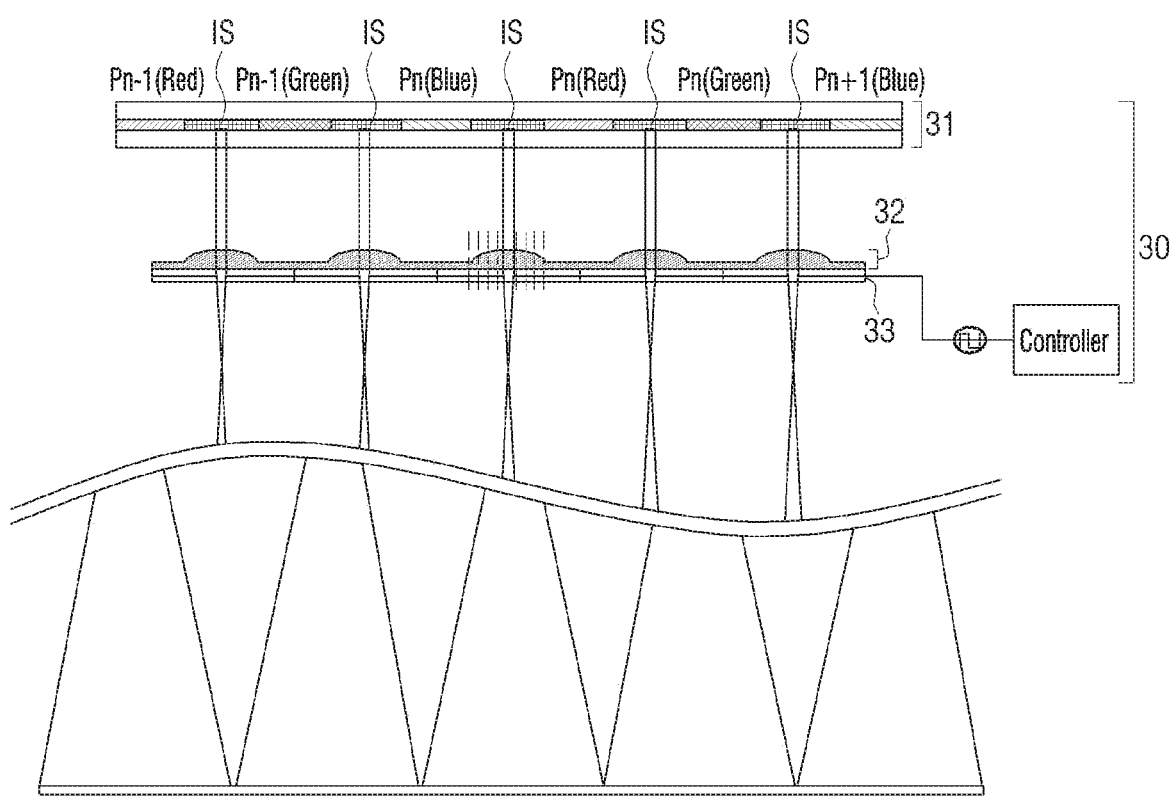
FIG. 2B is a diagram illustrating a photographing mode of an electronic apparatus according to an embodiment.

FIGS. 2A and 2B are diagrams illustrating a photographing mode of an electronic apparatus according to an embodiment.

As illustrated in FIG. 2A, a display according to an embodiment may provide a photographing mode that obtains an image by concentrating light incident from a specific field of view through an image sensing element.

For example, as illustrate in FIG. 2B, a display 30 may include a display panel 31 and an optical element 32, light incident from outside may be projected on an image sensing element (IS) provided on a display panel 110 through the optical element 32, and the image sensing element (IS) may obtain an image signal based on a projected signal. An optical element 120 may include an optical lens, and may include, for example, a micro-lens array, a lenticular lens, or other types of fine lens arrays. According to another embodiment, the display 30 may further include a field of view adjuster 33 that performs a function of adjusting a FOV of an image sensing element, and this will be described in detail later.

Figure 2C:
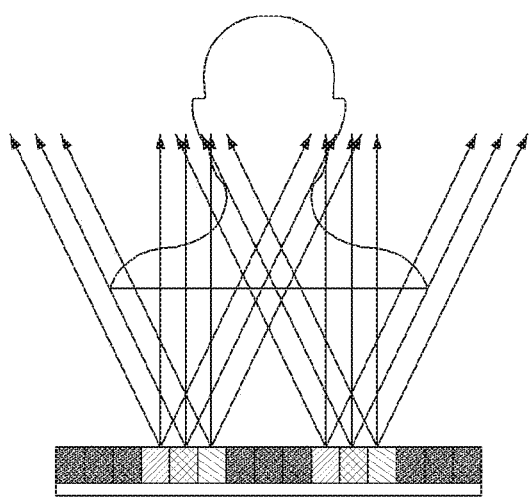
FIG. 2C is a diagram illustrating a display mode of an electronic apparatus according to an embodiment.
Figure 2D:
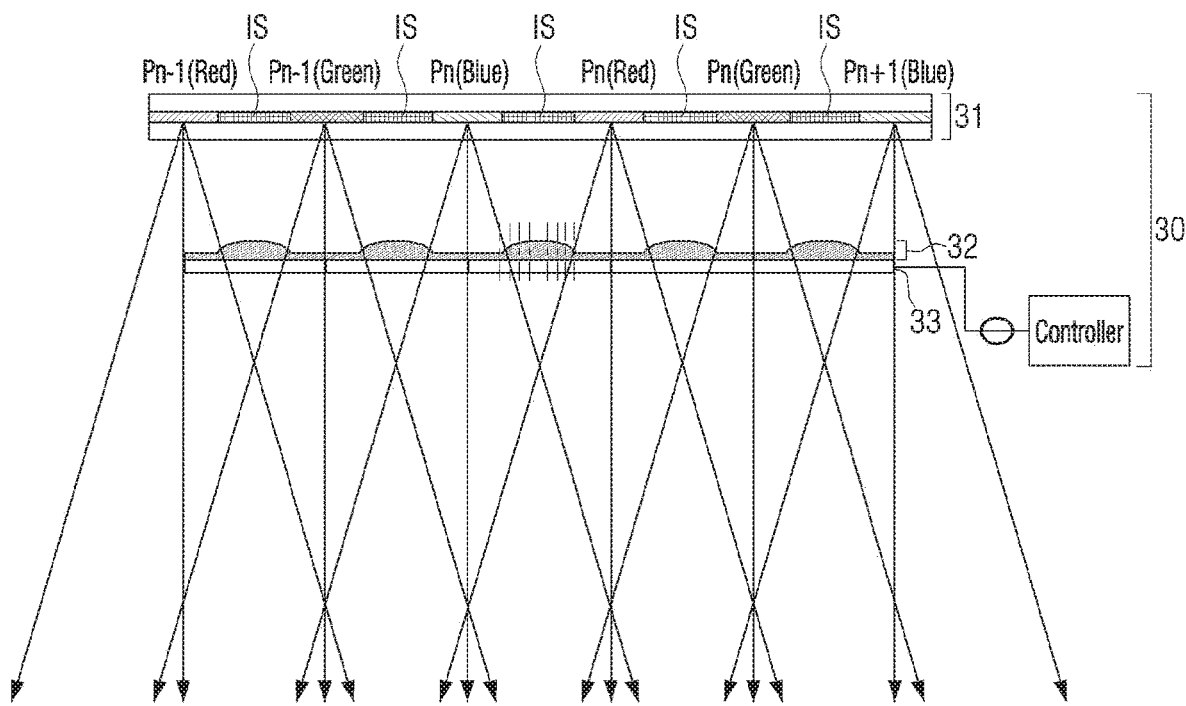
FIG. 2D is diagram illustrating a display mode of an electronic apparatus according to an embodiment.

FIGS. 2C and 2D are diagrams illustrating a display mode of an electronic apparatus according to an embodiment.

As illustrated in FIG. 2C, a display according to an embodiment may provide a display mode that displays an image by diffusing light from an image display pixel to a specific field of view.

For example, as illustrated in FIG. 2D, an image signal obtained by an image sensing element (IS) may be provided to an image display pixel (P) so that the image display pixel (P) may display am image.

Figure 3:
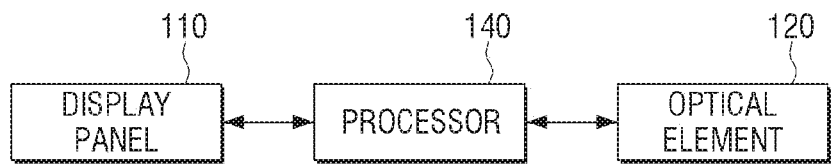
FIG. 3 is a block diagram illustrating a configuration of an electronic apparatus according to an embodiment.

FIG. 3 is a block diagram illustrating a configuration of an electronic apparatus according to an embodiment.

According to FIG. 3, an electronic apparatus 100 includes a display panel 110, an optical element 120, and a processor 130.

The electronic apparatus 100 may be implemented as a television, a smartphone, or the like, but is not limited thereto. If the electronic apparatus is a device having a function of displaying and photographing such as a tablet PC, a notebook PC, a large format display (LED), a distal signage, a digital information display (DID), a video wall, a kiosk, or the like, the electronic apparatus 100 may not be limited thereto and may be applicable.

The display panel 110 may be implemented as various display units such as a liquid crystal display (LCD) panel, a light emitting diode (LED), a micro LED, an organic light emitting diode (OLED), a vacuum, fluorescent display (VFD), a field emission display (FED), an electro luminescence display (ELD), a plasma display panel (PDP), or the like.

As illustrated in FIG. 1A to FIG. 2D, the display panel 110 may include the plurality of image display pixels (P) and the plurality of image sensing elements (IS) arranged by units of at least one image display pixel. The image display pixel (P) may include all self-luminous elements such as organic light emitting diodes (OLED), a light emitting diode (LED), a micro LED, or the like, and all types of transmissive elements such as a liquid crystal display (LCD). For example, each of the image display pixels (P) may include a plurality of subpixels and the subpixels may be composed of Red (R), Green (G), and Blue (B). Thus, the display panel 110 may be configured by arranging the pixels consisting of R, G, B of the subpixels toward a plurality of lines and columns, which means it is arranged in the matrix form.

The image sensing element (IS) may include any element that uses a photoelectric effect such as a photodiode, a CMOS, a CCD, or the like. The image sensing element (IS) may be implemented as a single sensing element (or a single pixel element), or a two-dimensional sensing element in the form of a macro pixel.

Figure 4A:
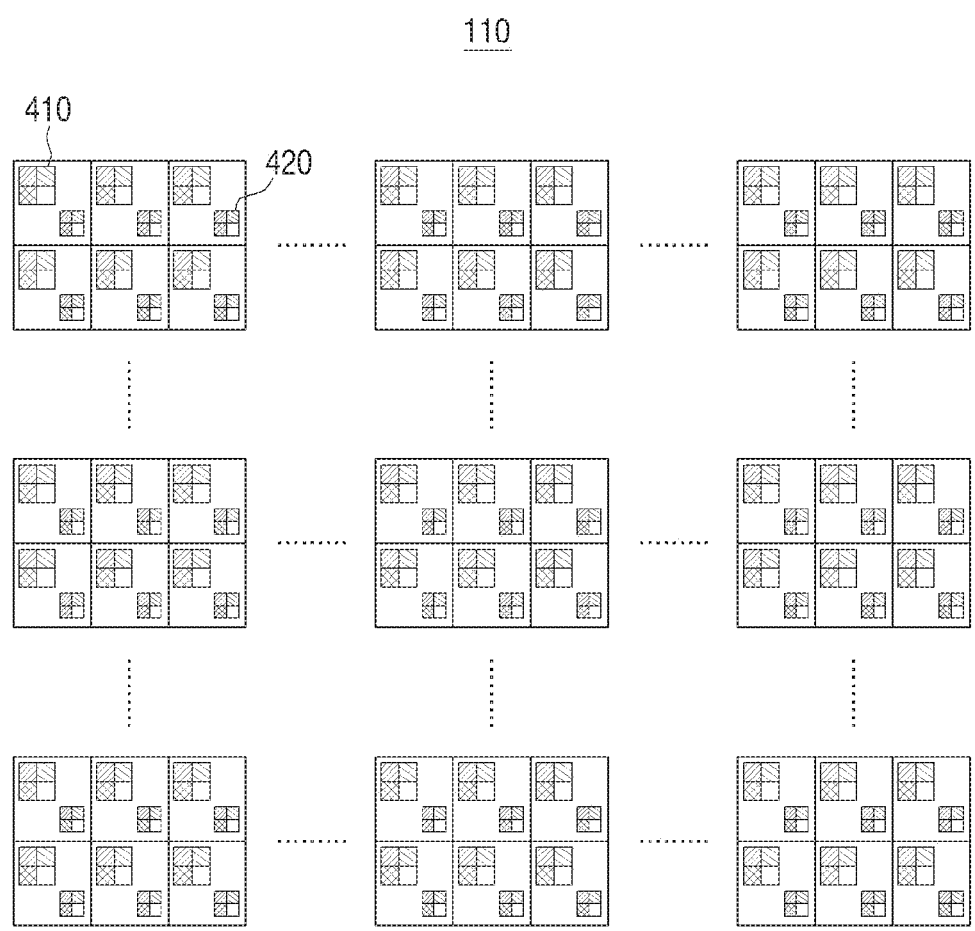
FIG. 4A is a diagram illustrating an implementation form of a display according to an embodiment.
Figure 4B:
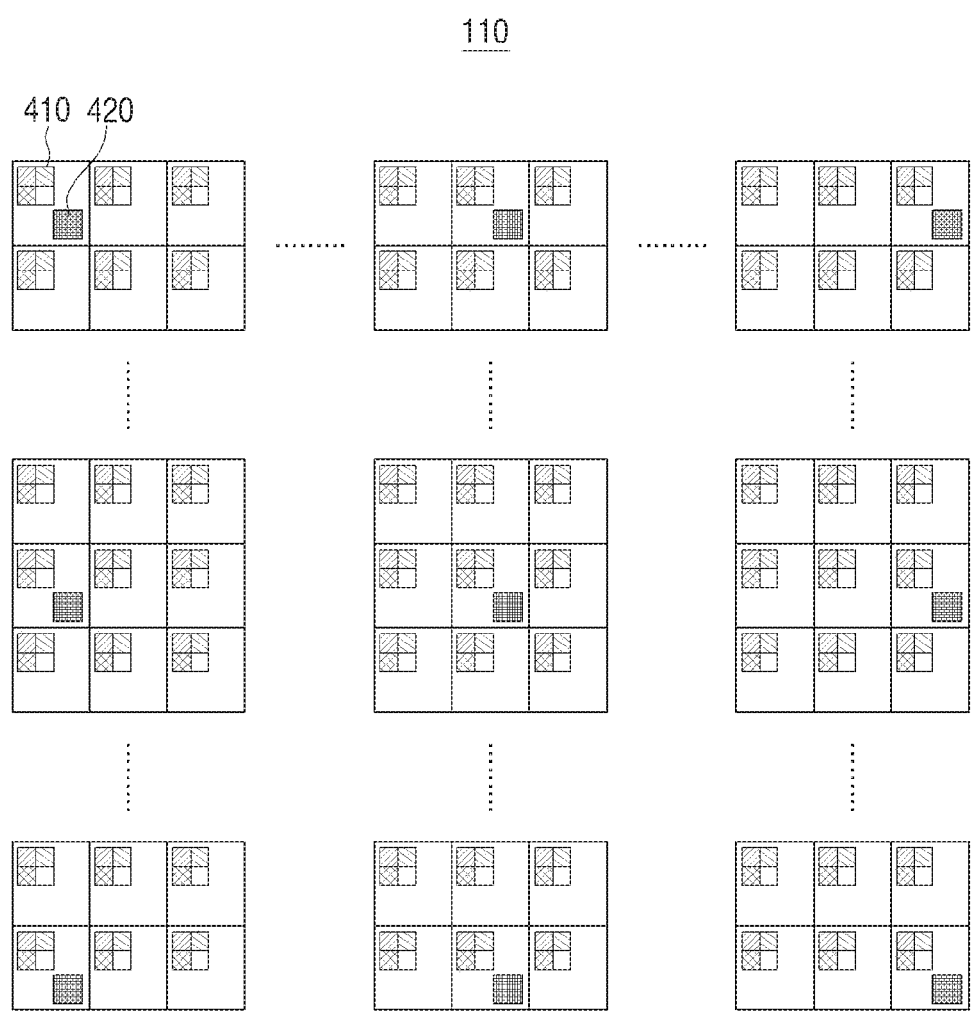
FIG. 4B is a diagram illustrating an implementation form of a display according to an embodiment.

FIG. 4A and FIG. 4B are diagrams illustrating an implementation form of a display according to an embodiment.

As illustrated in FIG. 4A, the display panel 110 according to an embodiment may be formed as an image display pixel 410 and an image sensing element 420 are arranged at a 1:1 ratio. For example, the image display pixel 410 and the image sensing element 420 may be alternately arranged as illustrated. The image sensing element 420 may be a single sensing element (or a single pixel element), but is not limited thereto. For example, the image sensing element 420 may be implemented as a plurality of pixel elements.

As illustrated in FIG. 4B, the display panel 110 according to another embodiment may be formed as the image display pixel 410 and the image sensing element 420 are arranged at a n:1 ratio. For example, the image sensing element 420 may be arranged between the plurality of image display pixels 410 as illustrated. The image sensing element 520 may be implemented as a plurality of pixel elements, for example, as a two-dimensional sensing element in the form of a macro pixel. However, it is not limited thereto, the image sensing element 420 may be implemented as a single sensing element (or a single pixel element) even in the arrangement form at a ratio of n:1.

Figure 5A:
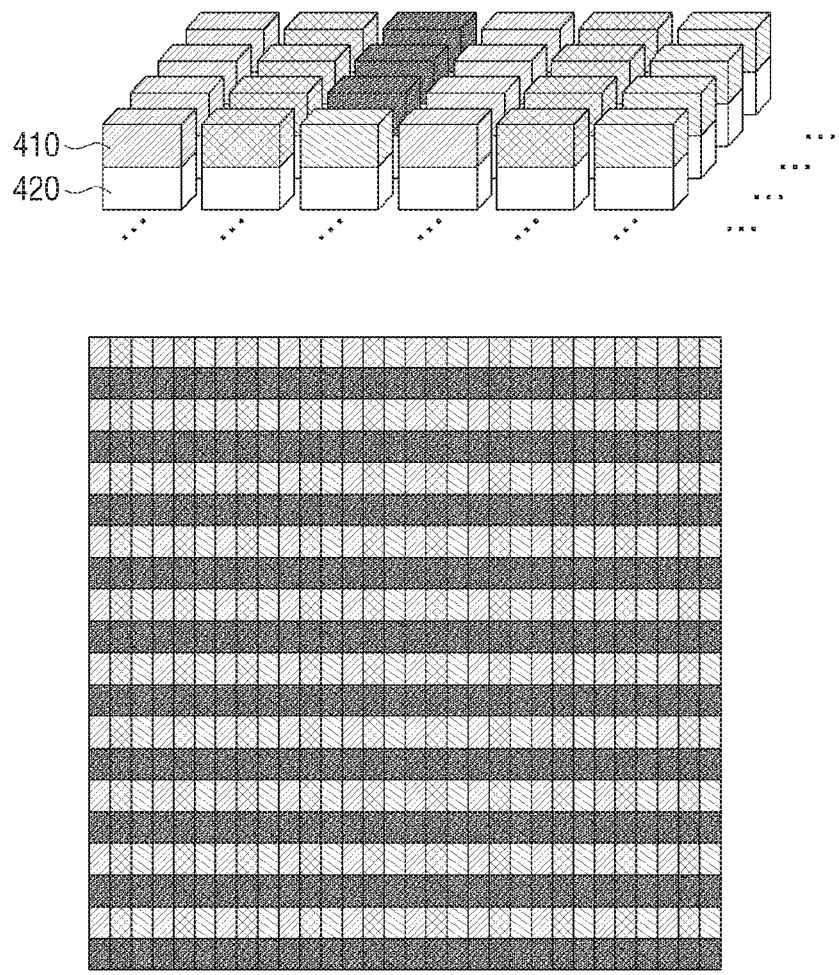
FIG. 5A is a diagram illustrating an implementation form of a display according to another embodiment.
Figure 5B:
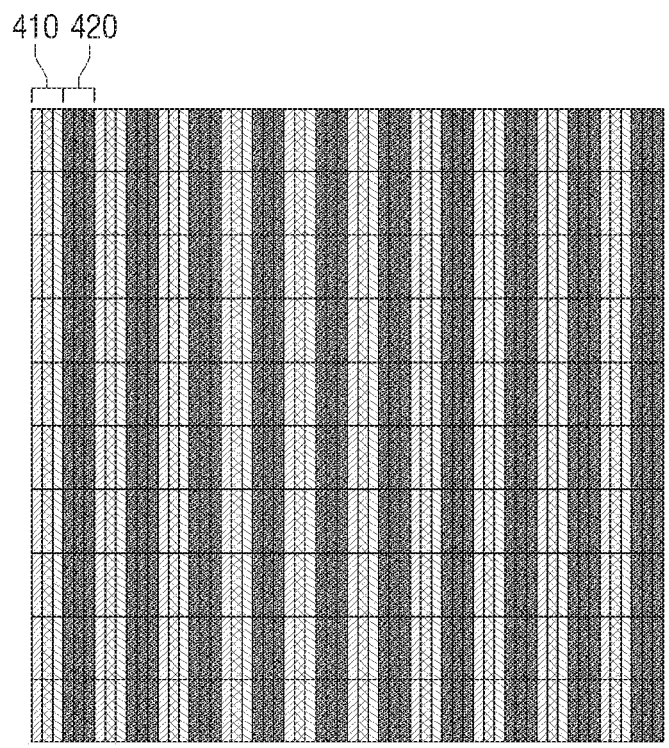
FIG. 5B is a diagram illustrating an implementation form of a display according to another embodiment.
Figure 5C:
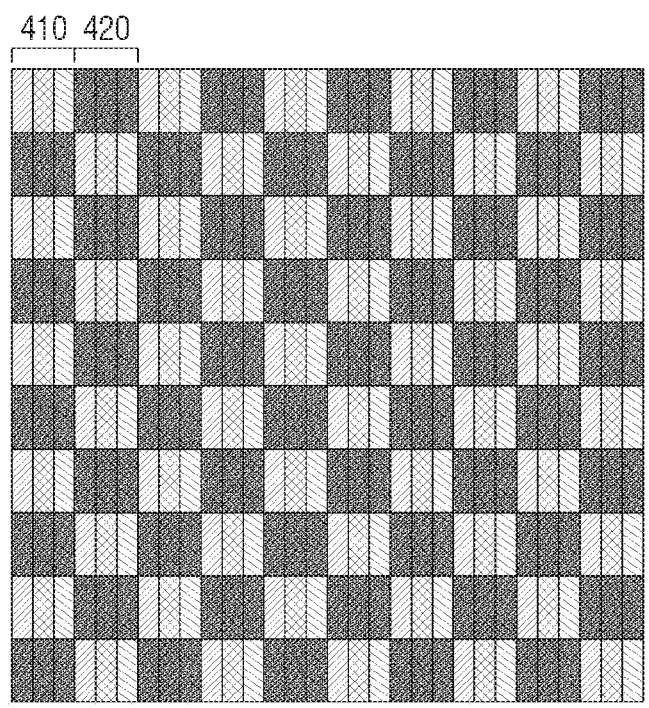
FIG. 5C is a diagram illustrating an implementation form of a display according to another embodiment.

FIGS. 5A to 5C are diagrams illustrating an implementation form of a display according to another embodiment.

As illustrated in FIG. 5A, the image display pixel 410 and the image sensing element 420 according to an embodiment may be two-dimensionally arranged up and down. For example, the image sensing element 420 may be arranged on the front surface or the rear surface of the image display pixel 410.

As illustrated in FIG. 5B, the image display pixel 410 and the image sensing element 420 according to another embodiment may be two-dimensionally arranged left and right. For example, the image sensing element 520 may be arranged on the left or right side of the image display pixel 410.

As illustrated in FIG. 5C, the image display pixel 410 and the image sensing element 420 may be two-dimensionally and alternately arranged up-and-down and left-and-right. For example, the image display pixel 410 may be alternately arranged so as not to be adjacent to each other, and the image sensing element 420 may be alternately arranged so as not to be adjacent to each other.

The display panel 110 may include a driving circuit, a backlight unit, or the like which may be implemented in forms such as an a-si TFT, a low temperature poly silicon (LTPS) TFT, an organic TFT (OTFT), or the like.

Referring back to FIG. 3, the optical element 120 may perform a function of concentrating light incident from a specific field of view. The optical element 120 may be implemented as a micro-lens array, a lenticular lens, or other types of fine lens arrays.

The optical element 120 may provide the image sensing element (IS) by concentrating light incident from a specific field of view. In this case, the image sensing element (IS) may obtain an image signal based on the concentrated light through the optical element 120. For example, the image sensing element (IS) may include a photoelectric element and convert the incident light to an electrical signal to obtain the image signal. In this case, the electrical signal may be transmitted to the processor 130 through a metal wire located on the upper part of a substrate The processor 130 controls the overall operation of the electronic apparatus 100.

According to an embodiment, the processor 130 may be implemented as a digital signal processor (DSP) that processes digital image signals, a microprocessor, or a timing controller (T-CON), but is not limited thereto. The processor 130 may include one or more of a central processing unit (CPU), a micro controller unit (MCU), a micro processing unit (MPU), a controller, an application processor (AP), or a communication processor (CP), an ARM processor, or the like, or may be defined as corresponding terms. Also, the processor 130 may be implemented as a system on chip (SoC) with built-in processing algorithms or a large scale integration (LSI), or a field programmable gate array (FPGA).

The processor 130, controls the panel device to display an image generated based on the sensed incident light, receive a user input corresponding to a partial area of the displayed image, controls the optical element to magnify the partial area of the displayed image, and controls the panel device to display a magnified image of the partial area. The user input may include at least one of a touch input, a gesture input, or a voice input.

According an embodiment, the processor 130 may control the display panel 110 to display an image of the partial area magnified on the basis of the input signal received from at least one first image sensing element corresponding to the partial area when the user input is a partial magnification command for a partial area displayed on the display panel 110.

For example, when displaying an image on the entire screen, the processor may perform an image processing of a plurality of photographed images of different fields of view obtained from the plurality of image sensing elements, such as an image stitching process, to display the image on the display panel 110. In the process, resolution of a partial image obtained from each of the plurality of image sensing elements may be scaled as n:1 based on resolution of the display panel 110. That is, an image photographed by n pixels included in the image sensing element may be displayed on one image display pixel of the display panel 110.

Based on a partial magnification command for a partial area being input, the processor 130 may provide a magnified image by scaling an image obtained from at least one image sensing element corresponding to the partial area at a ratio of m:1 (referring to $1 \leq m < n$). In this case, the expression of "scaling" does not refer to resolution reduction. When the number of pixels of the image sensing element that has obtained a corresponding partial image is larger than the number of pixels included in the partial area of the display panel 110 displaying the corresponding partial image, there may be no resolution reduction. However, when the magnified image is provided at a ratio of a pixel of the image sensing element to a pixel of the image display pixel with a ratio of e1 to 1, the magnified image may not be substantially scaled. In this case, resolution and a quality of the magnified image may not be reduced unlike the conventional image processing that magnifies an image through an image processing in which a partial image is cropped from an entire photographed image.

According to another embodiment, based on a partial area selected according to a user input being changed, the processor 130 may control the display panel 110 to display an image processed in accordance with the user input of the partial area changed based on an input signal received from at least one second image sensing element corresponding to the changed partial area. For example, based on the partial area corresponding to the magnification command being changed, the processor 130 may control the display panel 110 to display a magnified image of the changed partial area based on an input signal received from at least one second image sensing element corresponding to the changed partial area.

According to another embodiment, the electronic apparatus may further include a field of view adjuster (not shown) configured to control a field of view (FOV) of the plurality of image sensing elements. According to an embodiment, the field of view adjuster (not shown) may adjust the FOV of each of the plurality of image sensing elements (IS). According to another embodiment, the field of view adjuster (not shown) may adjust the FOV of each of at least one image sensing element (IS) differently to adjust the FOV of the display panel 110 as a result.

For example, based on the magnification command for the partial area of the displayed image being input, the processor 130 may control the field of view adjuster (not shown) to reduce the FOV of the image sensing element corresponding to the partial area.

According to an embodiment, the field of view adjuster (not shown) may be disposed on the upper portion or the lower portion of the optical element 120, and may include a liquid crystal shutter composed of a plurality of cells having a finer size than the image sensing element (IS). The liquid crystal shutter indicates a form that is implemented to block light like a shutter of a camera. Each of the plurality of cells may operate in a liquid crystal shutter method in accordance with an applied voltage. For example, the processer 130 may control whether a voltage is applied to each of the plurality of cells or not to control whether each of the plurality of cells is opened or closed, and the field of view of the image sensing element (IS), based thereon, may be adjusted.

The processor 130 may identify at least one image sensing element corresponding to a partial area of a displayed image based on an arrangement position of a plurality of image sensing elements, and adjust at least one of an aperture position or aperture size of at least one liquid crystal shutter corresponding to the identified image sensing element. For example, based on the magnification command for the partial area being input, the processor 130 may identify an image sensing element disposed on a position corresponding to the partial area, and may control the aperture size of at least one liquid crystal shutter corresponding to the identified image sensing element to be reduced. In this case, a FOV of the corresponding image sensing element may be reduced, and a magnified image may be provided based on an image photographed by the corresponding image sensing element having a narrower FOV than other image sensing elements.

According to another embodiment, a field of view adjuster (not shown) may include a voltage applying unit that applies a voltage to an optical element. In this case, the optical element may include a plurality of liquid crystal lenses that liquid crystal alignment angles change according to an intensity of a voltage. In this case, the field of view of the image sensing element may be adjusted by controlling at least one of whether or not the voltage is applied to the liquid crystal lenses or the intensity of the applied voltage corresponding to each of the image sensing element (IS). In this case, the processor 130 may identify at least one of the image sensing element corresponding to a partial area of a displayed image on the basis of an arrangement position of the plurality of image sensing elements, and control a voltage applying unit to apply different voltages to at least one liquid crystal lens corresponding to the identified image sensing element. For example, the processor 130, based on the magnification command for the partial area being input, may identify the image sensing element arranged at a position corresponding a partial area, and may control the voltage applying unit to apply voltage different from the other liquid crystal lenses to a corresponding liquid crystal lens in order to reduce the FOV of the identified image sensing element.

Figure 6:
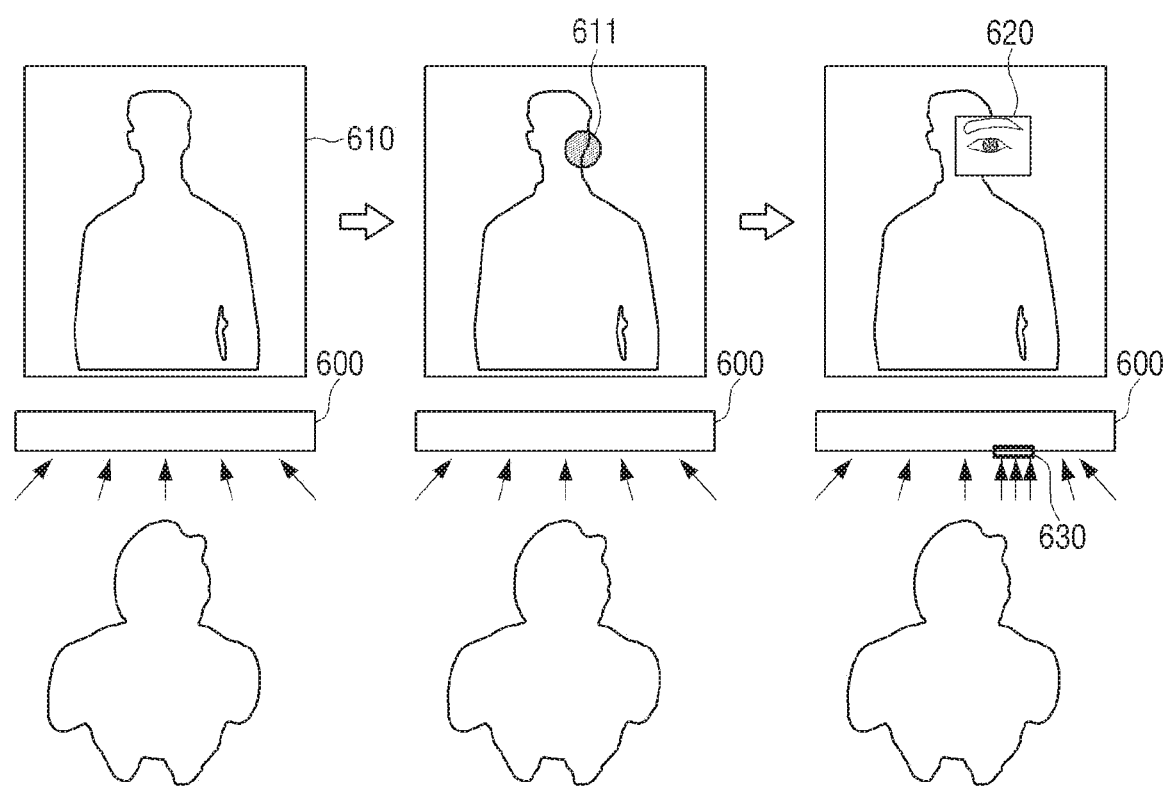
FIG. 6 is a diagram illustrating a method for providing a magnified partial image according to an embodiment.

FIG. 6 is a diagram illustrating a method for providing a magnified partial image according to an embodiment.

As illustrated in the first drawing of FIG. 6, according to an embodiment, in a state where a photographed image 610 is displayed through a plurality of image sensors provided in a display 600, selection and magnification commands for a partial area 611 of a displayed image 610 as illustrated in the second drawing may be received. For example, selection and magnification commands may be received by a touch input such as a pinch zoom in, a long press, or the like. As illustrated in the third drawing, the processor 130 according to an embodiment may display a magnified image 620 for the partial area 611 based on an image photographed by an image sensor 630 corresponding to the selected partial area 611.

Figure 7:
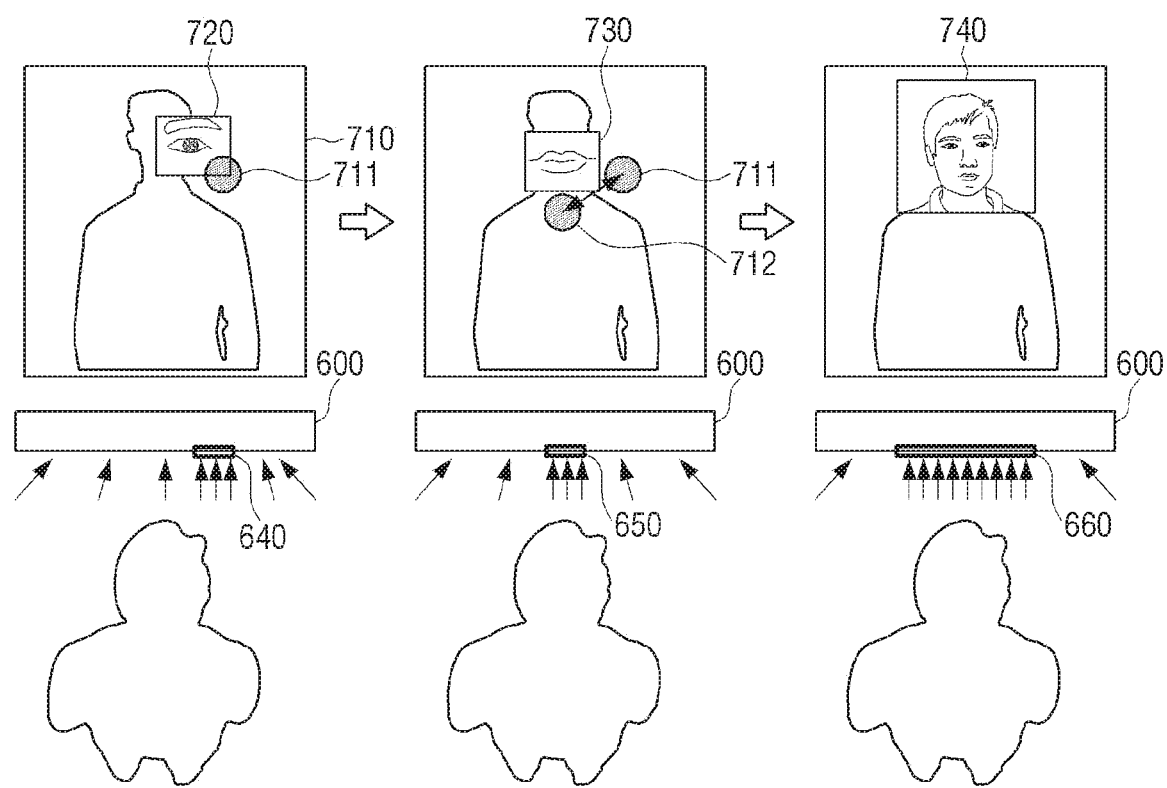
FIG. 7 is a diagram illustrating a method for providing a magnified partial image according to another embodiment.

FIG. 7 is a diagram illustrating a method for providing a magnified partial image according to another embodiment.

As illustrated in the first drawing of FIG. 7, the processor 130, based on selection and magnification commands for a partial area 711 of a displayed image 710 being input, may display a magnified image 720 based on an image photographed by an image sensor 640 corresponding to a corresponding area. The processor 130 may adjust to decrease a FOV of a corresponding image sensor 640, and the magnified image 720 may be provided on the basis of an image photographed by the image sensor 640 that the FOV is adjusted to decrease.

In a state as illustrated in the first drawing in FIG. 7, based on a user's selection area being moved to another area 712, the processor 130 may display a magnified image 730 for the corresponding area 711 on the basis of an image photographed by an image sensor 650 corresponding to the moved area 712. The processor 130 may adjust a FOV of the corresponding image sensor 650 by decreasing the FOV, and display the magnified image 730 on the basis of an image photographed by the image sensor 650 adjusted by decreasing the FOV.

As illustrated in the third drawing of FIG. 7, the processor 130, based on a user's zoom-in command being input, may display a magnified image 740 for an area selected according to the zoom-in command. In this case, the processor 130 may display the magnified image 740 on the basis of an image photographed by an image sensor 660 corresponding to the selected area. The processor 130 may adjust a FOV of the corresponding image by decreasing the FOV, and display the magnified image 730 photographed by the image sensor 660 adjusted by decreasing the FOV.

Figure 8:
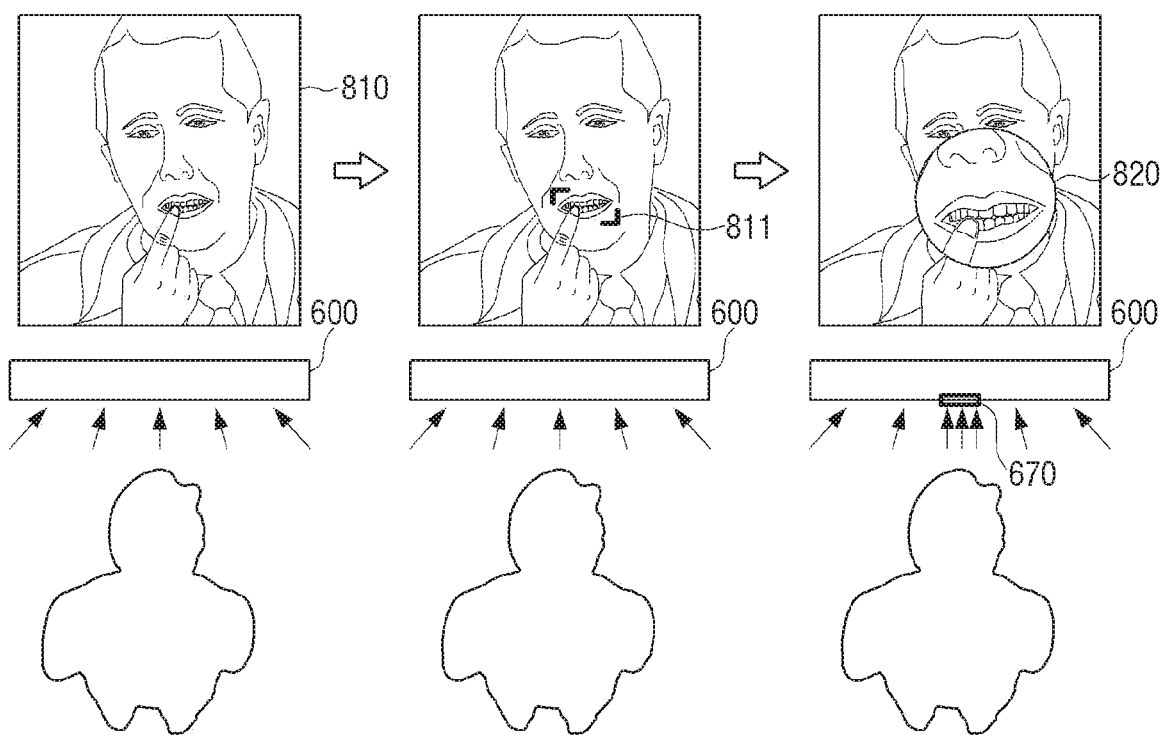
FIG. 8 is a diagram illustrating a method for providing a magnified partial image according to still another embodiment.

FIG. 8 is a diagram illustrating a method for providing a magnified partial image according to another embodiment.

As illustrated in the first drawing of FIG. 8, voice and gesture commands that select and magnify a partial area of a displayed image 810 may be input. For example, a voice command such as "zoom in here" and a gesture command that indicates a corresponding position with a finger may be input together.

In this case, as illustrated in the second drawing of FIG. 8, the processor 130 may recognize the finger's position based on a photographed image to detect an area indicated by a user, and may, as illustrated in the third drawing, display a magnified image based on an image photographed by an image sensor 670 corresponding to the photographed image. The processor 130 may adjust to decrease a FOV of the corresponding image sensor 670, and display a magnified image 820 based on the image photographed by the image sensor 670 that the FOV is adjusted to decrease.

According to another embodiment, based on a voice command such as "zoom in teeth" being input, the processor 130 may detect an area that includes the teeth by analyzing a photographed image, and may display a magnified image on the basis of an image photographed by the image sensor corresponding to the detected area.

Figure 9:
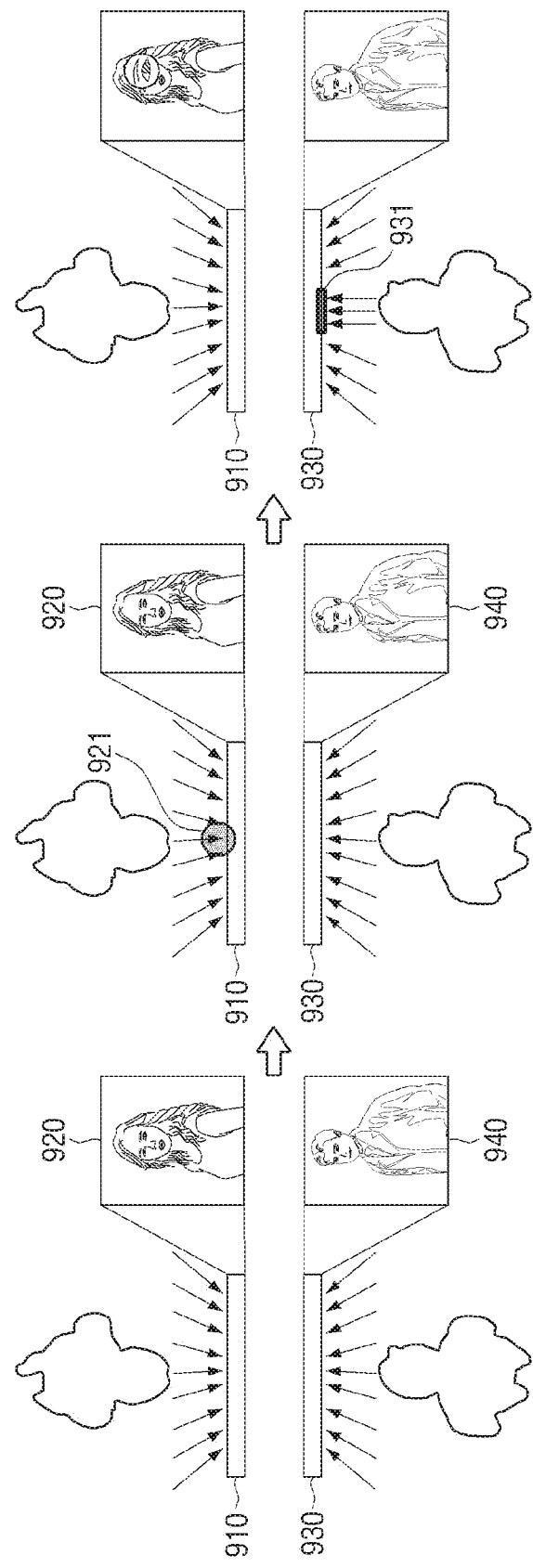
FIG. 9 is a diagram illustrating a method for providing a magnified partial image according to still another embodiment.

FIG. 9 is a diagram illustrating a method for providing a magnified partial image according to still another embodiment.

As illustrated in FIG. 9, the method for providing the magnified partial image according to an embodiment may be applied to a telemedicine scenario.

For example, as illustrated in the first drawing of FIG. 9, suppose there is a case where a patient teleconsults a doctor via video consult through each user device. In this case, a photographed image of the patient 920 may be displayed on a doctor's user device 910, and a photographed image of the doctor 940 may be displayed on a patient's user device 930.

As illustrated in the second drawing of FIG. 9, based on a selection and magnification commands for a specific area 921 on the patient's photographed image displayed through the doctor's user device 910 being input, the doctor's user device 910 may transmit a corresponding command to the patient's user device 930, and the patent's user device 930 may transmit a magnified image of an area selected by the doctor to the doctor's user device 910. In this case, as illustrated in the third drawing, a magnified image 922 for the specific area 921 in the doctor's user device 910. In this case, the patient's user device 930 may obtain the magnified image 922 based on an image photographed by an image sensor 931 corresponding to the specific area 921. The patient's user device 930 may adjust a FOV of a corresponding image sensor 931 by decreasing the FOV, and obtain the magnified image 922 based on an image photographed by the image sensor 931 adjusted by decreasing the FOV.

Figure 10:
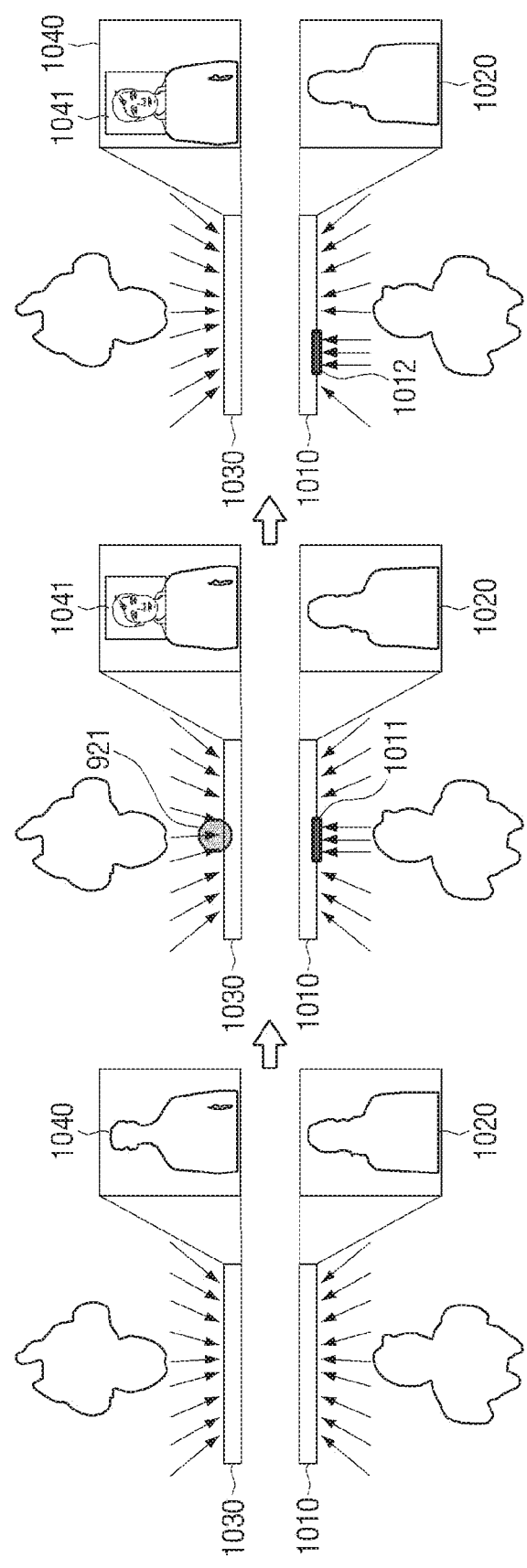
FIG. 10 is a diagram illustrating a method for providing a magnified partial image according to still another embodiment.

FIG. 10 is a diagram illustrating a method for providing a partial magnified image according to still another embodiment.

As illustrated in the first drawing of FIG. 10, suppose there is a case where a user A and user B perform a video call through a user equipment, respectively. In this case, a photographed image of the user B 1020 may be displayed on the user A's user device 1010, and a photographed image of the user A 1040 may be displayed on the user B's user device 1030.

As illustrated in the second drawing of FIG. 10, based on a selection and magnification commands for a specific area 1041 on the photographed image of the user A 1040 displayed through the user B's user device 1030 being input, the B's user device 1030 may transmit a corresponding command to the user A's user device 1010, and the user A's user device 1010 may transmit the magnified image 1041 of an area selected by the user B to the user B's user device 1030. In this case, as illustrated in the third drawing, even though the user A moves, the user A's user device 930 may continuously transmit a magnified image of a corresponding area by tracking an area, such as a face area, selected by the user B to the user B's user device 1030. In this case, the user A's user device 1010 may select image sensors 1011 and 1012 corresponding to the face area according to the user's movement, and obtain a magnified image based on an image photographed by the selected image sensors 1011 and 1012. The user A's user device 1010 may adjust a FOV of corresponding image sensors 1011 and 1012 by decreasing the FOV, and obtain a magnified image 1041 based on an image photographed by the image sensors 1011 and 1012 that the FOV is adjusted by decreasing the FOV.

Figure 11:
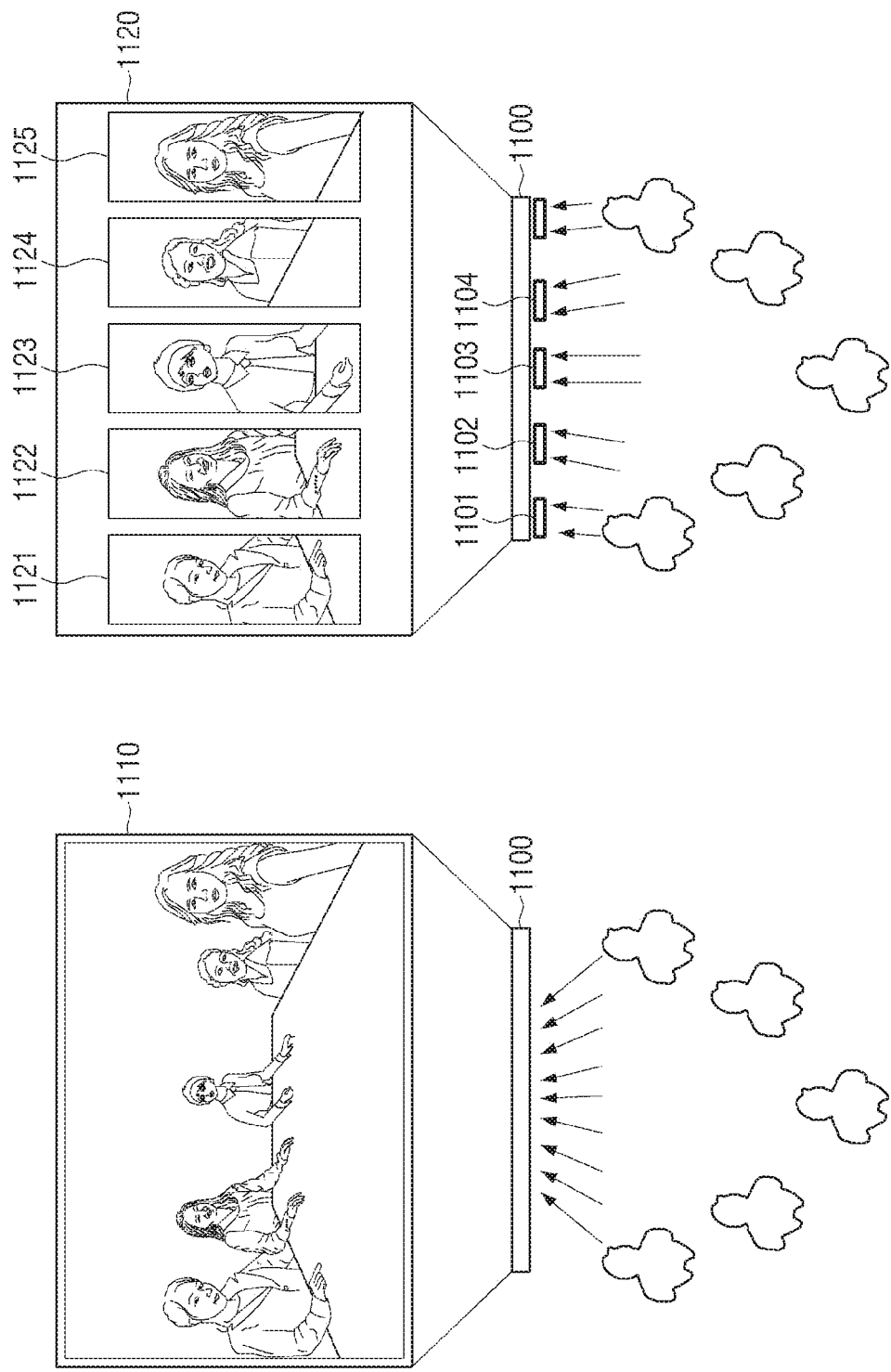
FIG. 11 is a diagram illustrating a method for providing a magnified partial image according to still another embodiment.

FIG. 11 is a diagram illustrating a method for providing a magnified partial image according to still another embodiment.

As illustrated in the first drawing of FIG. 11, suppose there is a case where a plurality of people are photographed by a specific device 1100. For example, a photographed image 1110 may be provided to a device (not shown) of a counterpart who is on the video call.

In this case, as illustrated in the second drawing according to a predetermined event, the specific device 1100 may detect a specific area of an object, such as a portrait area, from a photographed image 1110, and provide an image 1120 providing the detected portrait area in the same size to the counterpart's device (not shown). For example, the predetermined event may be an event that executes portrait auto focus mode, but is not limited thereto. In this case, the specific device 1100 may provide an image including a plurality of portrait areas 1121, 1122, 1123 and 1124 magnified with the same size based on images photographed from a plurality of image sensors 1101 to 1104 corresponding to the plurality of portrait areas included in the photographed image 1110 to a counterpart's device (not shown). In this case, the specific device 1110 may adjust FOVs of each of the plurality of image sensors 1101 to 1104 differently in order to provide the plurality of portrait areas 1121, 1122, 1123 and 1124 in the same size, when necessary.

For example, the specific device 1110 may magnify a FOV of an image sensor 1103 corresponding to a portrait area having a relatively small size in the photographed image 1110 to obtain a magnified image for the corresponding portrait area.

Figure 12A:
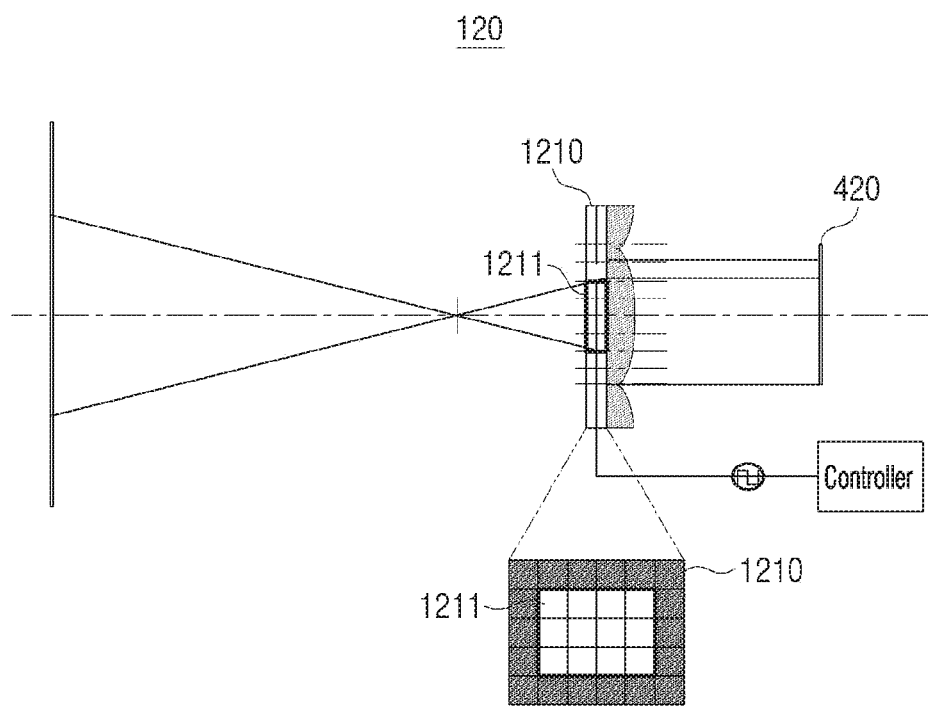
FIG. 12A is a diagram illustrating a method for adjusting a FOV of an image sensing element according to an embodiment.
Figure 12B:
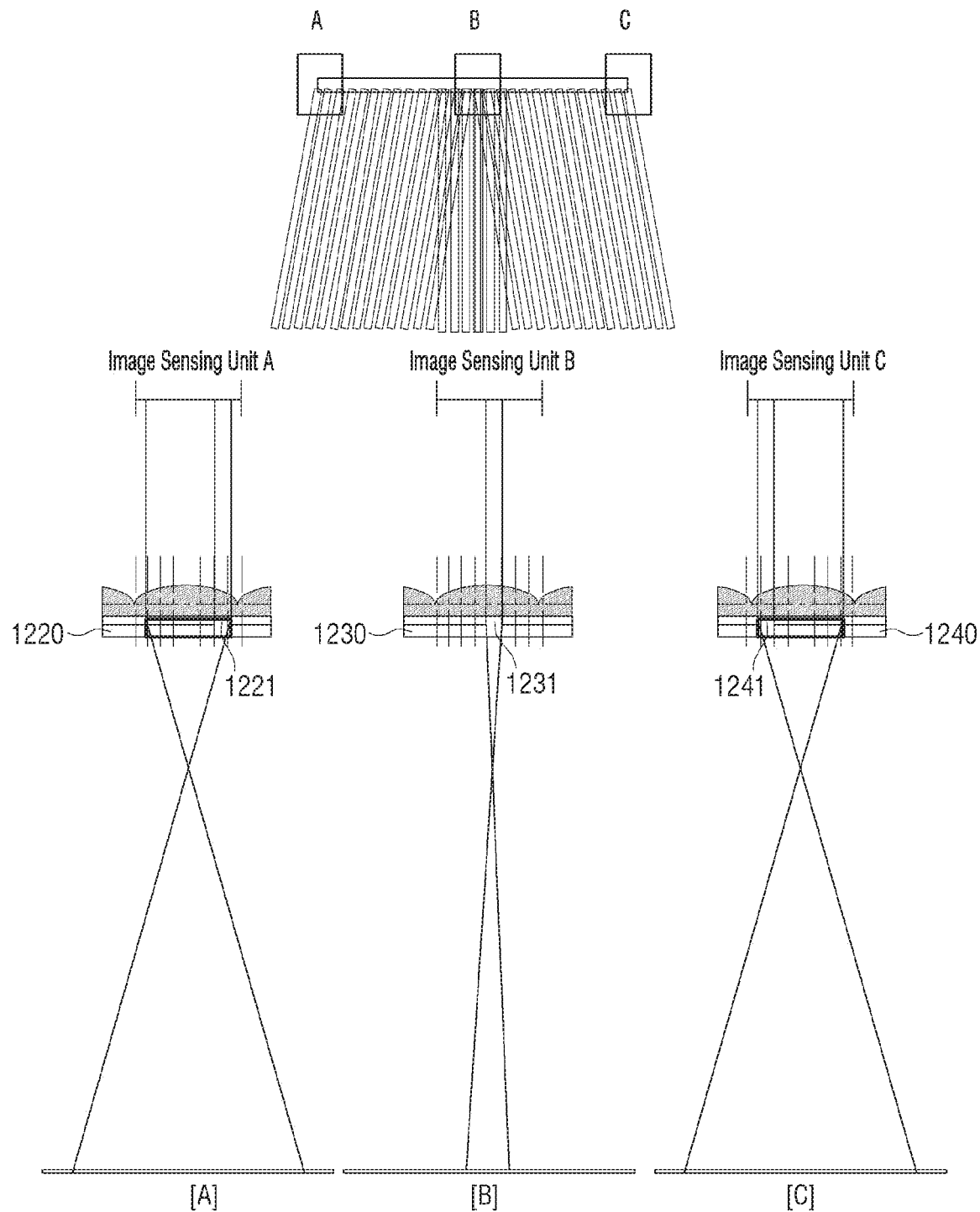
FIG. 12B is a diagram illustrating a method for adjusting a FOV of an image sensing element according to an embodiment.
Figure 13A:
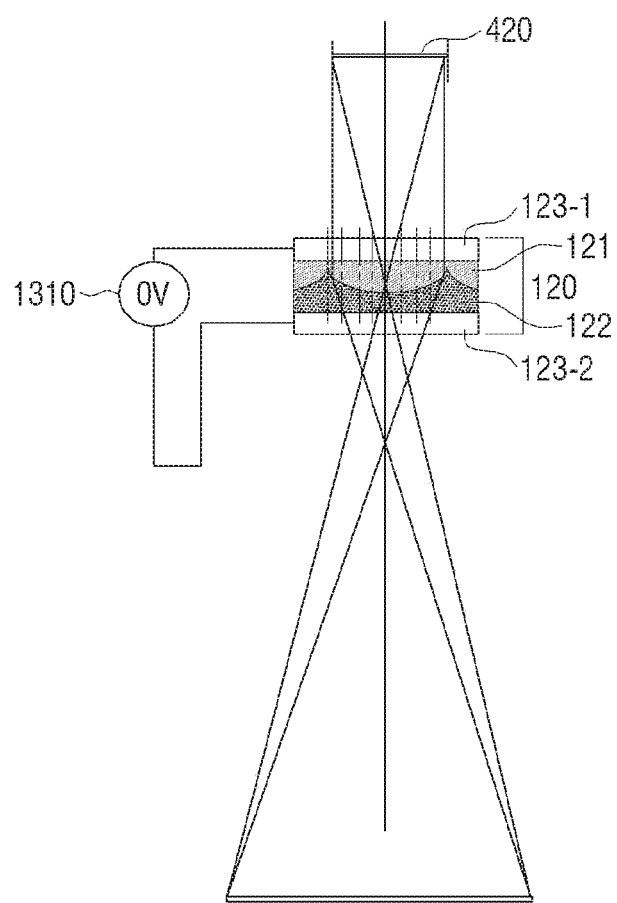
FIG. 13A is a diagram illustrating a method for adjusting a FOV of an image sensing element according to another embodiment.
Figure 13B:
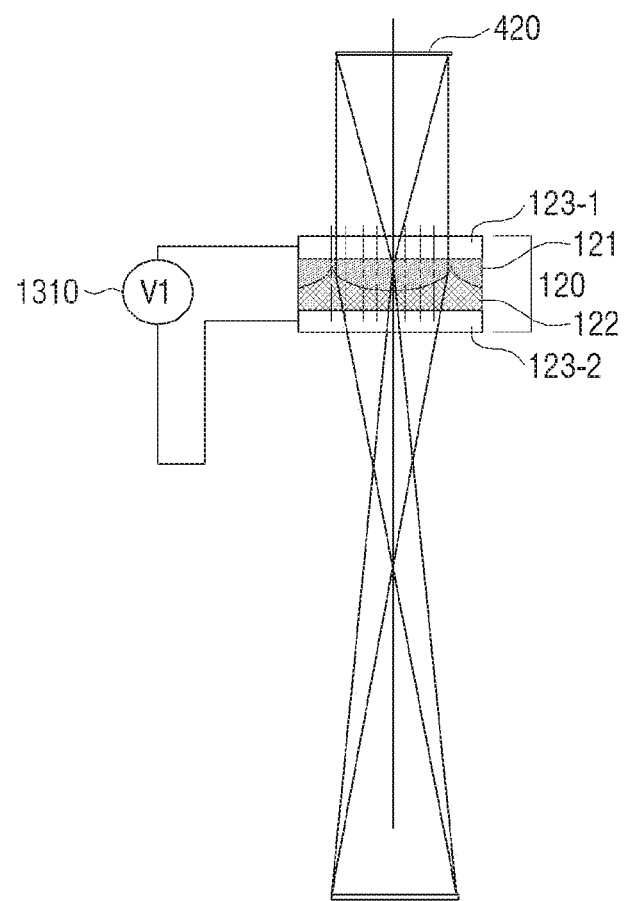
FIG. 13B is a diagram illustrating a method for adjusting a FOV of an image sensing element according to another embodiment.
Figure 13C:
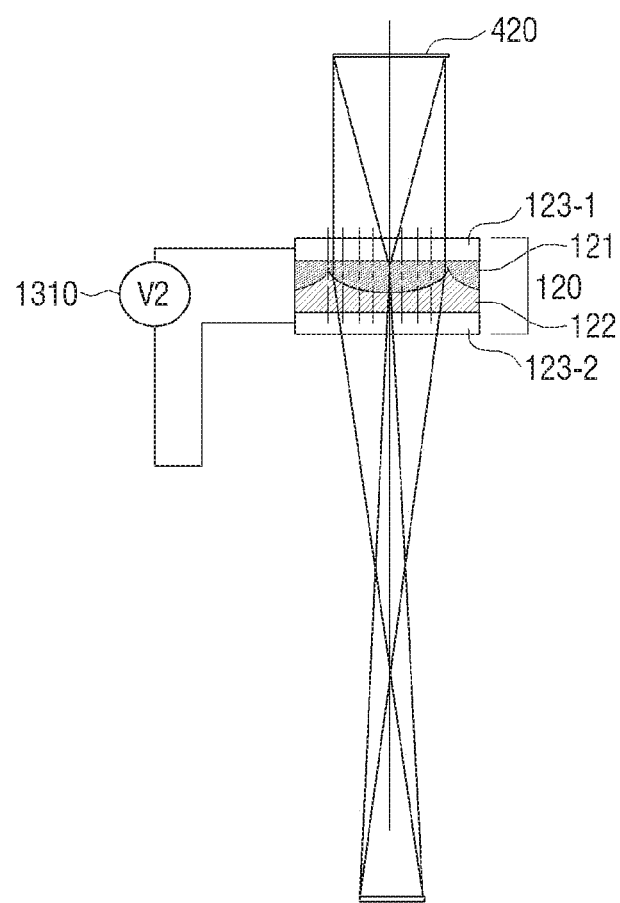
FIG. 13C is a diagram illustrating a method for adjusting a FOV of an image sensing element according to another embodiment.
Figure 13D:
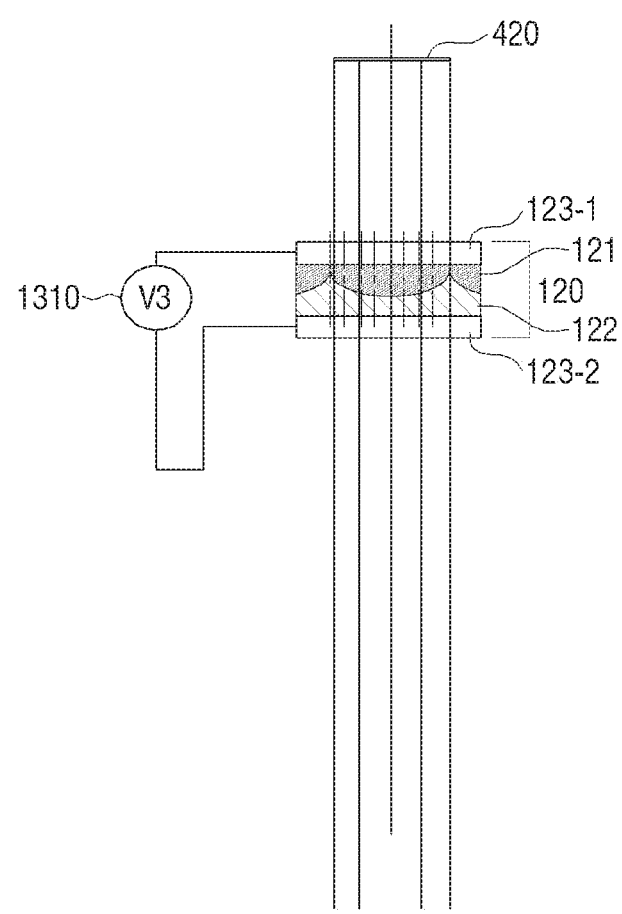
FIG. 13D is a diagram illustrating a method for adjusting a FOV of an image sensing element according to another embodiment.

FIGS. 12A and 12B are diagrams illustrating methods for adjusting a FOV of an image sensing element according to an embodiment.

As illustrated in FIG. 12A, a field of view adjuster according to an embodiment may be implemented in the form of a liquid crystal shutter 1210. The liquid crystal shutter 1210 may be in the form including a plurality of cells having a finer size than the image sensing element 420. For example, the liquid crystal shutter 1210 may be designed in a TAT array structure to allow light to be incident on a partial area of the image sensing element 420. For example, the liquid crystal shutter 1210 may be composed of a transparent substrate and electrodes, a cell to which power source is not applied may be maintained in a transparent state to transmit light, and a cell to which power source is applied may be turned into an opaque state so that light cannot be transmitted. For example, the liquid crystal shutter 1210 may be implemented as Pin Hole Mask (or Pin Hole Mask Array).

According to FIG. 12A, when power source is not applied to at least one cell area 1211 of the liquid crystal shutter 1210, light may be incident only through a corresponding cell area 711, and the incident light may be refracted in one area of the optical element 120 and incident on a partial area of the image sensing element 420. Thus, the FOV of the image sensing element 420 may be adjusted through the liquid crystal shutter 1210. According to an embodiment, at least one optical element 120 may be disposed on an upper portion and a lower portion of each of the liquid crystal shutter 1210 so that a separate FOV may be generated for each image sensing element 5120.

According to an embodiment, a controller that controls application of voltage for the liquid crystal shutter 1210 may be provided, and the controller may control the liquid crystal shutter 1210 according to a control signal of the processor 130.

As illustrated in FIG. 12B, an aperture size of the liquid crystal shutter corresponding to each position of the image sensing element may be controlled. For example, as illustrated in FIG. 12B, based on a partial magnification command of a user being input in a central area of a photographed image, the aperture size 1231 of a liquid crystal shutter 1230 corresponding to an image sensing element (B) positioned at a center may be reduced more than aperture sizes 1221 and 1241 of liquid crystal shutters 1220 and 1240 corresponding to the remaining image sensing elements A and C. In this case, since a FOV of the image sensing element (B) positioned at the center is relatively reduced, a magnified image may be obtained through a corresponding image sensing element (B).

FIGS. 13A to 13D, and FIG. 14 are diagrams illustrating a method for adjusting a FOV of an image sensing element according to another embodiment.

According to another embodiment, the optical element 120 may be implemented as a liquid crystal lens array (i.e., a micro liquid crystal lens array) to perform a function of a field of view adjuster (not shown). For example, a focal distance of the liquid crystal lens may be adjusted by using a ferroelectric of the liquid crystal. That is, an orientation (or an orientation angle) of liquid crystal molecules may be differed according to an intensity of a voltage, and thus the focal distance of the liquid crystal lens may be adjusted. In this case, it may be preferable that the image sensing element is formed as a macro pixel of at least 2×2 or more.

As illustrated in FIGS. 12A to 12D, the liquid crystal lens according to an embodiment may include a lens layer 121, a liquid crystal layer 122, and electrode layers 123-1 and 123-2. An optical characteristic of the liquid crystal layer 122 may change according to the intensity of the voltage through applied electrode layers 123-1 and 123-2 and control a refraction of light passing through the lens layer 121 in different directions. It is preferable that the electrode layers 123-1 and 123-2 have a flat shape with a transparent material to minimize an influence on the light passing through the lens layer 121. For example, as illustrated in FIGS. 13A to 13D, the orientation angle of liquid crystal molecules may be changed according to the intensity of the voltage applied to the electrode layers 123-1 and 123-2, and thus the focal distance of the liquid crystal lens may be changed. As such, based on the focal distance of the liquid crystal lens being changed, the FOV of the image sensing element 420 may be changed.

Figure 14:
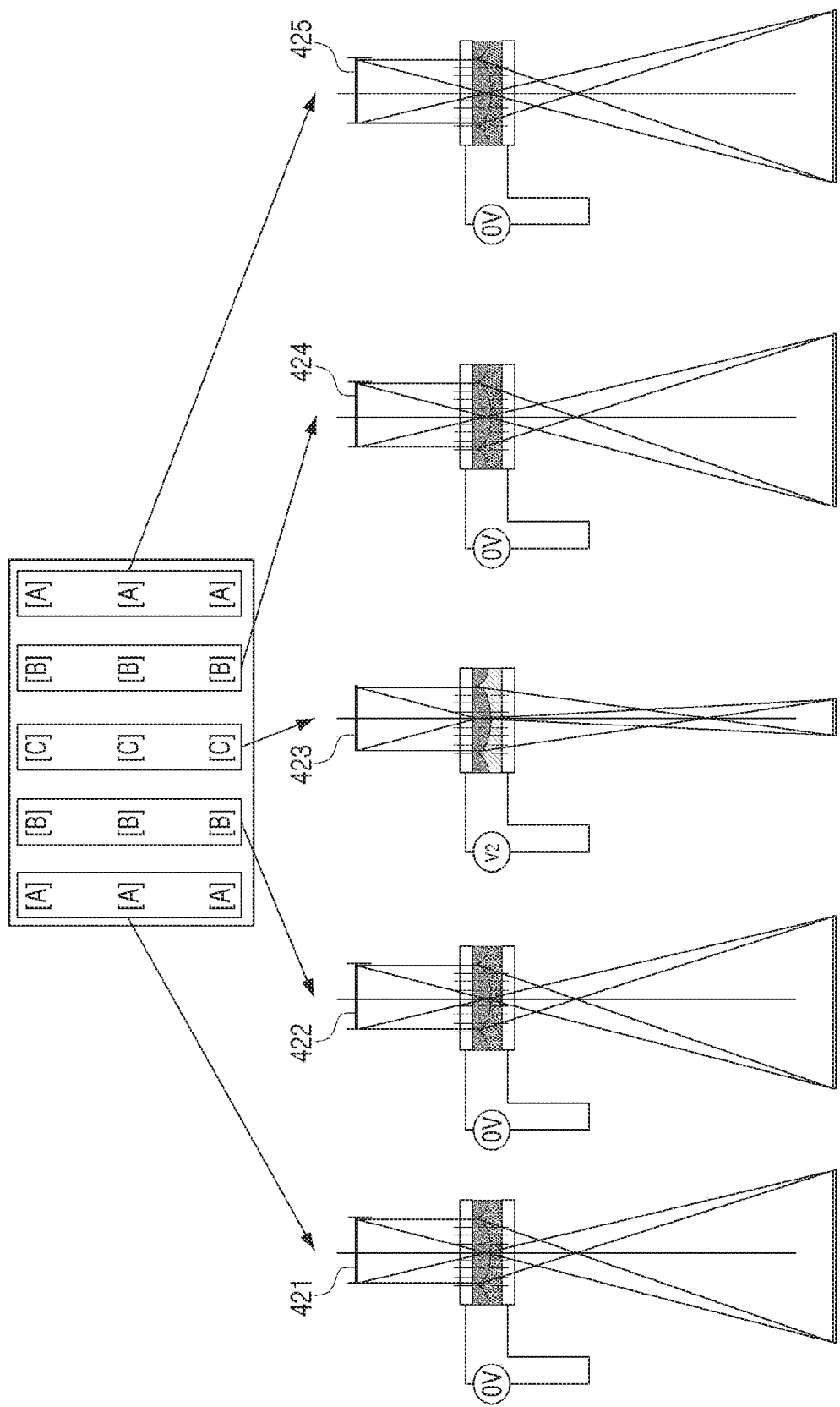
FIG. 14 is a diagram illustrating a method for adjusting a FOV of an image sensing element according to another embodiment.

As illustrated in FIG. 14, a focal distance of a liquid crystal lens corresponding to each position of the image sensing element, that is a FOV, may be adjusted. For example, based on a partial magnification command of a user in a central area of a photographed image being input, in the case of a liquid crystal lens corresponding to an image sensing element 423 positioned in the central area, a FOV may adjust a focal distance of the liquid crystal lens in order to reduce the FOV of the remaining image sensors 421, 422, 521, and 525. In this case, since the FOV of the image sensing element 423 positioned in the center is relatively reduced, a magnified image may be obtained through the corresponding image sensing element 423.

Figure 15:
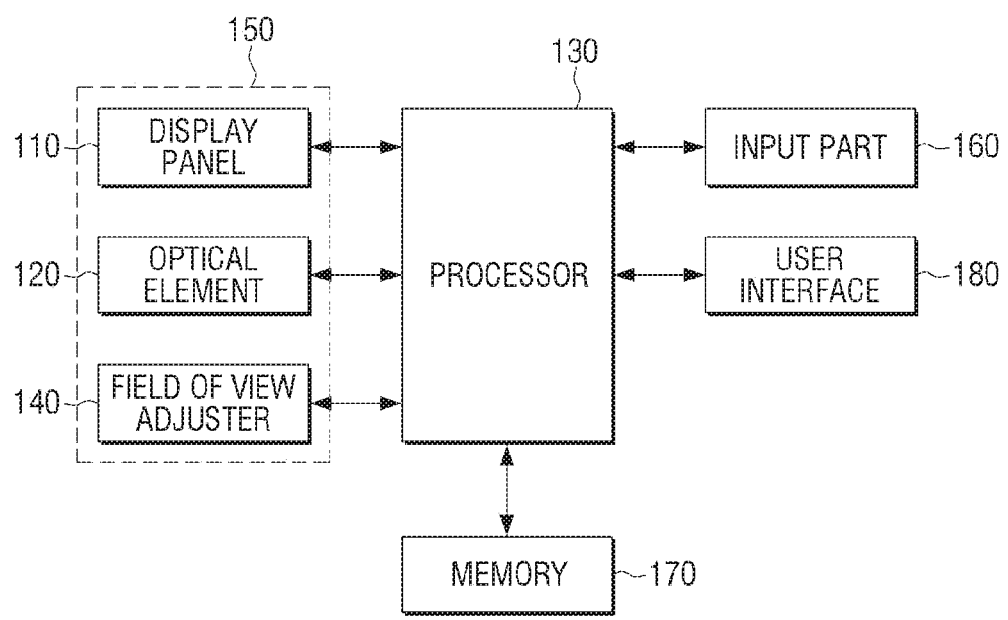
FIG. 15 is a block diagram illustrating a detailed configuration of an electronic apparatus according to an embodiment.

FIG. 15 is a block diagram illustrating a detailed configuration of an electronic apparatus according to an embodiment.

According to FIG. 15 the electronic apparatus 100 includes the display panel 110, the optical element 120, the processor 130, the field of view adjuster 140, an input part 160, a memory 170, and a user interface 180.

Since a configuration of a display 150 including the display panel 110, the optical element 120 and the field of view adjuster 140 is described in FIG. 3, a detailed description thereof will be omitted.

The processor 130 may control the display 150 to display an obtained image according to various embodiments.

Figure 16:
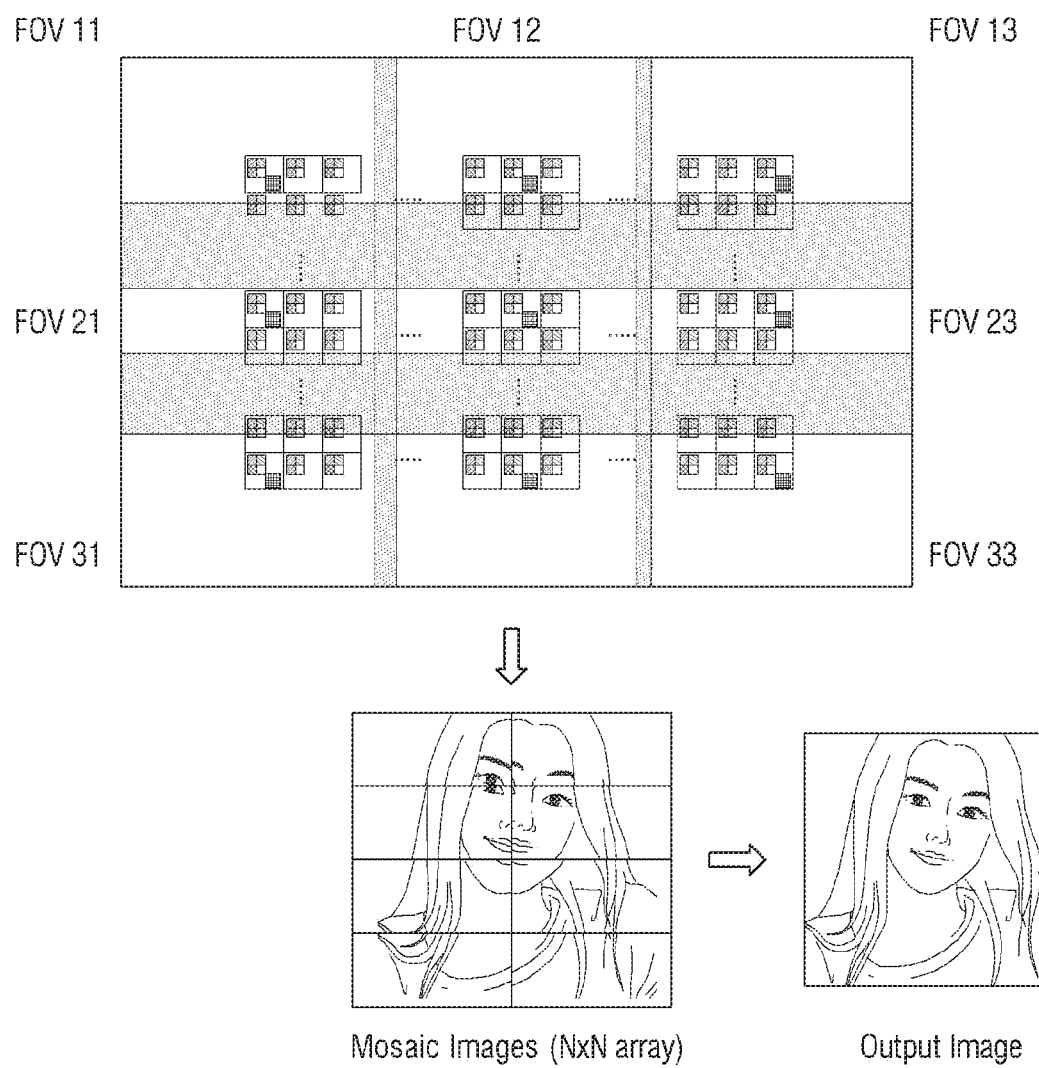
FIG. 16 is a block diagram illustrating a method for obtaining an image according to an embodiment.

The processor 130 may process a plurality of images to obtain an output image to be displayed on the image display pixel, based on the FOV of each of the plurality of images obtained from the plurality of image sensing elements. For example, when the image sensing element is implemented as a two-dimensional sensing element of a macro pixel, the FOV of an image signal obtained from the plurality of image sensing elements may be overlapped. In this case, the processor 130 may perform image processing on the plurality of image signals obtained from the plurality of image sensing elements, such as an image stitching process illustrated in FIG. 16, to obtain the output image signal to be provided to the image display pixel. For example, the processor 130 may obtain the output image through at least one of warping, feature based alignment, rotation, translation, or white balancing. That is, the processor 130 may obtain an image signal reconfigured by the image stitching process, convert the reconfigured image signal into an electrical signal according to display driving timing, and transmit the electrical signal to each image display pixel.

According to another embodiment, the processor 130 may perform processing on audio data. For example, the processor 130 may perform various processes such as decoding or amplification regarding the audio data, noise filtering, or the like.

Referring back to FIG. 15, the processor 130 may control the plurality of image sensing elements and the plurality of image display pixels differently according to the driving timing. For example, the processor 130 may perform time-division driving so that the plurality of image sensing elements are not driven during a first period in which the plurality of image display pixels are driven, and the plurality of image display pixels are not driven during a second period in which the plurality of image sensing elements are driven. This is performed to exclude interference from light emitted from the image display pixel and light concentrating to the image sensing element. However, in some cases, the first period in which the image display pixel is driven and the second period in which the image sensing element is driven may partially overlap. For example, at least one image display pixel or at least one image sensing element may be simultaneously driven during at least a part of the period which is changed into the first period or the second period.

The input part 160 received various types of content. For example, the input part 160 may be input the image signal with a function of streaming or downloading from an external device (i.e., a source device), an external storage medium (i.e., USB), an external server (i.e., web hard), or the like, through a communication method such as AP-based (Wi-Fi, Wreless LAN network), Bluetooth, Zigbee, wired/wireless Local Area Network (LAN), WAN, Ethernet, IEEE 1394, High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), Digital Visual Interface (DVI), or the like. The image signal may be a digital signal, but is not limited thereto.

The memory 170 may store data needed for various embodiments. For example, the memory 170 may be implemented in the form of a memory embedded in the electronic apparatus 100 or a removable memory in the electronic apparatus 100, depending on a purpose of data storage. For example, data for driving the electronic apparatus 100 may be stored in the memory embedded in the electronic apparatus 100, and data for an extended function of the electronic apparatus 100 may be stored in the removable memory in the electronic apparatus 100. The memory embedded in the electronic apparatus 100 may be implemented as at least one of volatile memory (i.e., dynamic RAM (DRAM), static RAM (SRAM), synchronous dynamic RAM (SDRAM), or the like), non-volatile memory (i.e., one-time programmable ROM (OTROM), programmable ROM (PROM), erasable and programmable ROM (EPROM), electrically erasable and programmable ROM (EEPROM), mask ROM, flash ROM (i.e., NAND flash, NOR flash, or the like), hard drive, or solid state drive (SSD), and the removable memory in the electronic apparatus 100 may be implemented as memory card (i.e., compact flash (CF), secure digital (SD), micro secure digital (Micro-SD), mini secure digital (Mini-SD), extreme digital (xD), multi-media card (MMC), or the like), an external memory that can be connected to a USB port (i.e., USB memory), or the like.

The user interface 180 may be implemented as a device such as a button, a touch pad, a mouse, and a keyboard, a touch screen capable of performing the above-described display function and operation input function, a microphone for being input user voice, a camera that recognizes user gestures and movements, communication interface that receives a user voice signal from an external device having a microphone, or the like.

The electronic apparatus 100 may further include a tuner and a demodulator according to an embodiment.

The tuner (not shown) may receive a RF broadcast signal by tuning a channel selected by a user or all pre-stored channels among Radio Frequency (RF) broadcast signals received through an antenna.

The demodulator (not shown) may receive and demodulate a digital IF (DIF) signal converted by the tuner, and perform channel decoding or the like.

Figure 17:
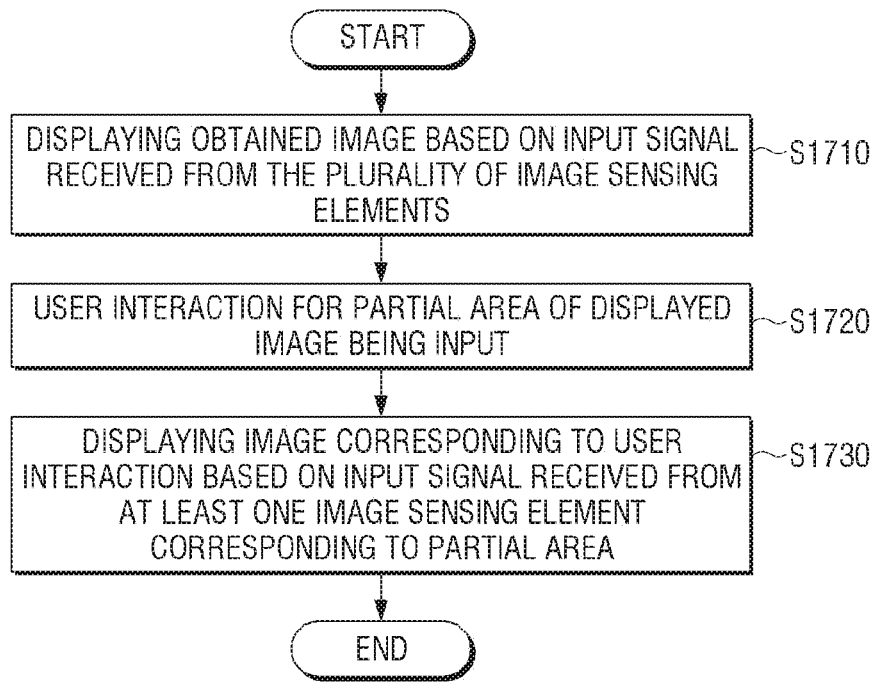
FIG. 17 is a flowchart illustrating a method for controlling an electronic apparatus according to an embodiment.

FIG. 17 is a diagram illustrating a method for controlling an electronic apparatus according to an embodiment.

As illustrated in FIG. 17, as for a method for controlling an electronic apparatus, the electronic apparatus may include a display panel including a plurality of image display pixels and a plurality of image sensing elements arranged between the plurality of image display pixels, and an optical element disposed on an upper portion of the display panel and projecting incident light onto the plurality of image sensing elements. Also, the plurality of image sensing elements may be configured to sense an incident light through the optical element.

According to the illustrated control method, an image obtained based on the sensed incident light (S1710).

Based on a user input for a partial area of a displayed image being received (S1720), an image corresponding to the user input is displayed (S1730). Specially, the illustrated control method comprises, based on receiving a user input corresponding to a partial area of the displayed image, controlling the optical element to magnify the partial area of the displayed image, and controlling the panel device to display a magnified image of the partial area.

The plurality of image display pixels may be arranged in a two-dimensional array, and the plurality of image sensing elements may be arranged in a two-dimensional array by a unit of at least one image display pixel. In addition, each of the plurality of image sensing elements may be disposed on the same layer as the at least one image display pixel, or may be disposed on a different layer.

In addition, in the phase S1730 of displaying an image corresponding to the user input, when the user input is a partial magnification command for the partial area, an image that the partial area is magnified may be displayed on the basis of an input signal received from at least one first image sensing element corresponding to the partial area.

In addition, in the phase S1730 of displaying the image corresponding to the user input, based on the partial area corresponding to the partial magnification command being changed according to the user input, a magnified image that a partial area changed based on an input signal received from at least one second image sensing element corresponding to a changed partial area may be displayed.

In addition, the electronic apparatus may further include a field of view adjuster configured to adjust the field of view (FOV) of the plurality of image sensing elements. In this case, in the phase S1730 of displaying an image corresponding to the user input, the FOV of at least one image sensing element corresponding to the partial area based on the user input may be adjusted, and an image corresponding to the user interaction based on the input signal received from the image sensing element that the FOV is adjusted may be displayed.

In addition, the field of view adjuster may include a liquid crystal shutter composed of a plurality of cells having a finer size than the image sensing element and disposed on an upper or lower of the optical element. In this case, in the phase S1730 of displaying an image corresponding to the user input, a FOV of at least one image sensing element corresponding to the partial area based on the user input may be adjusted, and an image corresponding to the user input based on an input signal received from the image sensing element that the FOV is adjusted may be displayed.

In addition, the field of view adjuster may include the liquid crystal shutter composed of the plurality of cells having a finer size than the image sensing element and disposed on the upper and lower portion of the optical element. In this case, in the phase S1730 of displaying an image corresponding to the user input, opening and closing operations of each of the plurality of cells may be controlled by controlling whether a voltage is applied to each of the plurality of cells configuring the liquid crystal shutter, at least one image sensing element corresponding to the partial area based on an arrangement position of the plurality of image sensing elements may be identified, and at least one of aperture position or aperture size of at least one liquid crystal shutter corresponding to the identified image sensing element may be adjusted.

In addition, the optical element may include a plurality of liquid crystal lenses whose liquid crystal orientation angle is changed according to intensity of voltage, and the field of view adjuster may include a voltage applying unit that applies voltage to the optical element. In this case, in the phase of S1730 of displaying an image corresponding to the user input, at least one image sensing element corresponding to the partial area may be identified based on the arrangement position of the plurality of image sensing elements, and the voltage applying unit may be controlled in order to apply different voltage to at least one liquid crystal lens corresponding to the identified image sensing element.

In addition, the user input may include at least one of touch input, gesture input, or voice input.

In addition, in the phase S1710 of displaying the obtained image, an image may be obtained by processing a plurality of images on the basis of the FOV of the plurality of images obtained from the plurality of image sensing elements.

In addition, the electronic apparatus may further include an optical element that disperses light emitted from the image display pixel.

In addition, the control method may further include time-division driving so that the plurality of image sensing elements are not driven during a first period in which the plurality of image display pixels are driven, and the plurality of image display pixels are not driven during a second period in which the plurality of image sensing elements are driven.

According to the various embodiments described above, the eye gaze misalignment when taking a self-photograph or in various interactions through the self-photograph may be solved by mounting the plurality of image sensing elements on the display panel.

In addition, since the image sensing element is embedded in the display, an effect of minimizing a bezel of the display device may be provided. Ultimately, a full screen display may be implemented.

A photographed image may be obtained by using the image sensing element arranged in an appropriate position for the user input. In this case, resolution and quality of a magnified image may not be reduced unlike the conventional image processing that magnifies an image through an image processing in which a partial image is cropped from an entire photographed image.

According to various embodiments described above, the methods according to various embodiments may be implemented with only hardware upgrades for existing electronic apparatus, but, in some cases, software upgrades may also be required.

According to an embodiment, various embodiments described above may be implemented as software including a command word stored in a machine-readable storage media by a machine (i.e., a computer). The machine may invoke the stored command word from the storage media and may include an image processing apparatus (i.e., an image processing apparatus (A)) according to the disclosed embodiments as an apparatus that can operate according to the invoked command word. When the command word is performed by the processor, the processor may directly perform a function corresponding to the command by using other components under the control of the processor. The command may include code generated or executed by a compiler or an interpreter. The machine readable storage media may be provided in the form of a non-transitory storage media. The "non-transitory" means that the storage media does not include a signal and is tangible, but does not distinguish that data is stored semi-permanently or temporarily in the storage media.

In addition, each of the components (i.e., modules or programs) according to various embodiments described above may be comprised of a single entity or a plurality of entities, some subcomponents of the corresponding subcomponents described above may be omitted, or other subcomponents may be further included in various embodiments. Generally, or additionally, some components (i.e., modules or programs) may be integrated into a single entity to perform the same or similar functions performed by each of the corresponding components prior to integration. Operations performed by a module, a program module, or other component, according to various embodiments, may be sequential, parallel, or both, executed iteratively or heuristically, or at least some operations may be performed in a different order, omitted, or other operations may be added.

The foregoing embodiments and advantages are merely exemplary and are not to be construed as limiting the present disclosure. The present teaching may be readily applied to other types of apparatuses. Also, the description of the embodiments of the present disclosure is intended to be illustrative, and not to limit the scope of the claims, and many alternatives, modifications, and variations will be apparent to those skilled in the art.

What is claimed is:

1. An electronic apparatus comprising:
   a panel device comprising a plurality of image display pixels and a plurality of image sensing elements each of which is macro pixels of a two dimensional form, wherein respective image sensing element of the plurality of image sensing elements are disposed between respective image display pixels of the plurality of image display pixels, the plurality of image display pixels and the plurality of image sensing elements are two-dimensionally and alternately arranged up-and-down and left-and-right;
   an optical element disposed on an upper portion of the panel device, wherein the plurality of image sensing elements are configured to sense an incident light through the optical element; and
   a processor configured to
      control the panel device to display an image generated based on the sensed incident light,
      receive a user input corresponding to a plurality of object areas included in the displayed image,
      identify the plurality of object areas from the displayed image based on the user input, and
      control the panel device to display an image including the plurality of object areas with same size,
      wherein the plurality of object areas with same size are magnified based on images generated by a plurality of image sensing elements corresponding to each of the identified plurality of object areas included in the displayed image.

2. The electronic apparatus as claimed in claim 1, wherein each of the plurality of image sensing elements is disposed on the same layer as the plurality of image display pixels or disposed on a different layer from the plurality of image display pixels.

3. The electronic apparatus as claimed in claim 1, wherein the processor is, based on the plurality of object areas corresponding to the user input being changed, configured to control the panel device to display a magnified image of the changed areas based on a signal sensed by at least one image sensing element corresponding to the changed area.

4. The electronic apparatus as claimed in claim 1, further comprising:
   a field of view adjuster configured to adjust a field of view (FOV) of the plurality of image sensing elements,
   wherein the processor is further configured to adjust the FOV of at least one image sensing element of the plurality of image sensing elements corresponding to the plurality of object areas based on the user input, and control the panel device to display the magnified image of the plurality of object areas based on a signal sensed by the at least one image sensing element of which the FOV is adjusted.

5. The electronic apparatus as claimed in claim 4, wherein the field of view adjuster is disposed on an upper portion or a lower portion of the optical element, and comprises a liquid crystal shutter composed of a plurality of cells having a finer size than the plurality of the image sensing elements, respectively, and
   wherein the processor is configured to
      control an opening and a closing operation of each of the plurality of cells by controlling whether a voltage is applied to each of the plurality of cells forming the liquid crystal shutter;
      identify at least one image sensing element of the plurality of image sensing elements corresponding to the plurality of object areas based on an arrangement position of the plurality of image sensing elements; and
      adjust at least one of an aperture position or an aperture size of the liquid crystal shutter corresponding to the identified at least one image sensing element.

6. The electronic apparatus as claimed in claim 4, wherein the optical element comprises a plurality of liquid crystal lenses that have respective liquid crystal alignment angles that change according to an intensity of a voltage,
   wherein the field of view adjustor applies a voltage to the optical element, and
   wherein the processor is configured to identify at least one image sensing element of the plurality of image sensing elements corresponding to the plurality of object areas based on the arrangement position of the plurality of image sensing elements, and control the field of view adjustor to apply a different voltage to at least one liquid crystal lens corresponding to the identified at least one image sensing element.

7. The electronic device as claimed in claim 1, wherein the user input comprises at least one of a touch input, a gesture input, or a voice input.

8. The electronic device as claimed in claim 1, wherein the processor is configured to process a plurality of images based on a field of view of each of the plurality of images obtained from the plurality of image sensing elements, and generate the displayed image based on the processed plurality of images.

9. The electronic device as claimed in claim 1, further comprising:
   an optical element configured to disperse light emitted from the image display pixels.

10. The electronic device as claimed in claim 1, wherein the processor is configured to perform time-division driving so that the plurality of image sensing elements are not driven during a first period in which the plurality of image display pixels are driven, and the plurality of image display pixels are not driven during a second period in which the plurality of image sensing elements are driven.

11. A control method for an electronic apparatus comprising a panel device comprising a plurality of image display pixels and a plurality of image sensing elements each of which is macro pixels of a two dimensional form, wherein respective image sensing element of the plurality of image sensing elements are disposed between respective image display pixels of the plurality of image display pixels, the plurality of image display pixel and the plurality of image sensing element is two-dimensionally and alternately arranged up-and-down and left-and-right, and an optical element disposed on the panel device, the plurality of image sensing elements configured to sense an incident light through the optical element, the method comprising:

controlling the panel device to display an image generated based on the sensed incident light;

receiving a user input corresponding to a plurality of object areas included in the displayed image;

identifying the plurality of object areas from the displayed image based on the user input; and controlling the panel device to display an image including the plurality of object areas with same size;

wherein the plurality of object areas with same size are magnified based on images generated by a plurality of image sensing elements corresponding to each of the identified plurality of object areas included in the displayed image.

12. The method as claimed in claim 11,
wherein each of the plurality of image sensing elements is disposed on the same layer as plurality of image display pixels or disposed on a different layer from the plurality of image display pixels.

13. The method as claimed in claim 11, further comprising:
based on the plurality of object areas corresponding to the user input being changed, controlling the panel device to display a magnified image of the changed areas based on a signal sensed by at least one image sensing element corresponding to the changed areas.

14. The method as claimed in claim 11, wherein the electronic apparatus further comprises a field of view adjuster configured to adjust a field of view (FOV) of the plurality of image sensing elements,
wherein the controlling the panel device to display the magnified image comprises adjusting the FOV of at least one image sensing element of the plurality of image sensing elements corresponding to the plurality of object areas based on the user input, and controlling the panel device to display the magnified image of the plurality of object areas based on a signal sensed by the at least one image sensing element of which the FOV is adjusted.

15. The method as claimed in claim 14,
wherein the field of view adjuster is disposed on an upper portion or a lower portion of the optical element, and comprises a liquid crystal shutter formed of a plurality of cells having a finer size than the plurality of image sensing elements, respectively, and
wherein the controlling the panel device to display the magnified image comprises
controlling an opening and a closing operation of each of the plurality of cells by controlling whether a voltage is applied to each of the plurality of cells forming the liquid crystal shutter,
identifying at least one image sensing element of the plurality of image sensing elements corresponding to the plurality of object areas based on an arrangement position of the plurality of image sensing elements, and
adjusting at least one of an aperture position or an aperture size of the liquid crystal shutter corresponding to the identified at least one image sensing element.

16. The method as claimed in claim 14,
wherein the optical element comprises a plurality of liquid crystal lenses that have respective liquid crystal alignment angles that change according to an intensity of a voltage,
wherein the field of view adjuster applies a voltage to the optical element, and
wherein the controlling the panel device to display the magnified image of the plurality of object areas comprises identifying at least one image sensing element of the plurality of image sensing elements corresponding to the plurality of object areas based on the arrangement position of the plurality of image sensing elements, and controlling the field of view adjuster to apply a different voltage to at least one liquid crystal lens corresponding to the identified at least one image sensing element.

17. The method as claimed in claim 10, wherein the user input comprises at least one of a touch input, a gesture input, or a voice input.

18. The method as claimed in claim 11, further comprising:
performing time-division driving so that the plurality of image sensing elements are not driven during a first period in which the plurality of image display pixels are driven, and the plurality of image display pixels are not driven during a second period in which the plurality of image sensing elements are driven.

* * * * *